US008876163B2

(12) United States Patent
Nishiyama et al.

(10) Patent No.: US 8,876,163 B2
(45) Date of Patent: Nov. 4, 2014

(54) OIL STORAGE TANK AND CONSTRUCTION VEHICLE

(75) Inventors: Wataru Nishiyama, Komatsu (JP); Ryouji Shiota, Komatsu (JP); Jun Yonehara, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/583,561

(22) PCT Filed: Mar. 2, 2012

(86) PCT No.: PCT/JP2012/055384
§ 371 (c)(1),
(2), (4) Date: Sep. 7, 2012

(87) PCT Pub. No.: WO2012/118182
PCT Pub. Date: Sep. 7, 2012

(65) Prior Publication Data
US 2013/0037551 A1 Feb. 14, 2013

(30) Foreign Application Priority Data

Mar. 2, 2011 (JP) ................................. 2011-045618
Mar. 2, 2011 (JP) ................................. 2011-045619

(51) Int. Cl.
*B60K 13/04* (2006.01)
*E02F 9/08* (2006.01)
*B60K 15/063* (2006.01)
(52) U.S. Cl.
CPC ............. *E02F 9/0883* (2013.01); *E02F 9/0833* (2013.01); *B60K 15/063* (2013.01); *B60Y 2200/412* (2013.01)
USPC ............................ 280/834; 280/830; 280/831

(58) Field of Classification Search
USPC .......................................... 280/834, 830, 831
See application file for complete search history.

(56) References Cited

U.S. PATENT DOCUMENTS 6,053,533 A * 4/2000 Osborn et al. ................. 280/830
6,152,470 A * 11/2000 Stuart et al. ................... 280/163
(Continued)

FOREIGN PATENT DOCUMENTS

JP 2001-59237 A 3/2001
JP 2001-262620 A 9/2001
(Continued)

OTHER PUBLICATIONS

The Korean Office Action for the corresponding Korean application No. 10-2012-7023245, issued on Jun. 25, 2014.

*Primary Examiner* — Kevin Hurley
*Assistant Examiner* — Michael Stabley
(74) *Attorney, Agent, or Firm* — Global IP Counselors, LLP

(57) ABSTRACT

An oil storage tank includes a step member, a first tank part and a second tank part. The step member has a placement face. The first tank part is disposed below the step member to support the step member. The second tank part is coupled to the first tank part and has an upper face a lower face, a first side face, a second side face and a recessed section. The upper face is provided above the placement face. The first side face faces the first tank part and is connected to the upper face and the lower face. The second side face is connected to the upper face, the lower face and the first side face. The recessed section is formed by a sloped face provided to a corner portion at which the upper face, the first side face and the second side face intersect.

19 Claims, 19 Drawing Sheets

(56) References Cited

U.S. PATENT DOCUMENTS

| | | | |
|---|---|---|---|
| 6,485,088 B1* | 11/2002 | Miyachi et al. | 296/190.08 |
| 7,988,167 B2* | 8/2011 | Sakitani et al. | 280/163 |
| 2008/0084090 A1* | 4/2008 | Sakitani et al. | 296/187.01 |
| 2011/0018308 A1* | 1/2011 | Uto et al. | 296/181.1 |
| 2012/0067660 A1* | 3/2012 | Kashu et al. | 180/296 |
| 2012/0174566 A1* | 7/2012 | Yamashita et al. | 60/295 |

FOREIGN PATENT DOCUMENTS

| | | |
|---|---|---|
| JP | 2002-61224 A | 2/2002 |
| JP | 2004-76313 A | 3/2004 |
| JP | 2004-116034 A | 4/2004 |
| JP | 2009-203675 A | 9/2009 |
| JP | 2009-227213 A | 10/2009 |
| JP | 2010-47975 A | 3/2010 |
| JP | 2011-6985 A | 1/2011 |

* cited by examiner

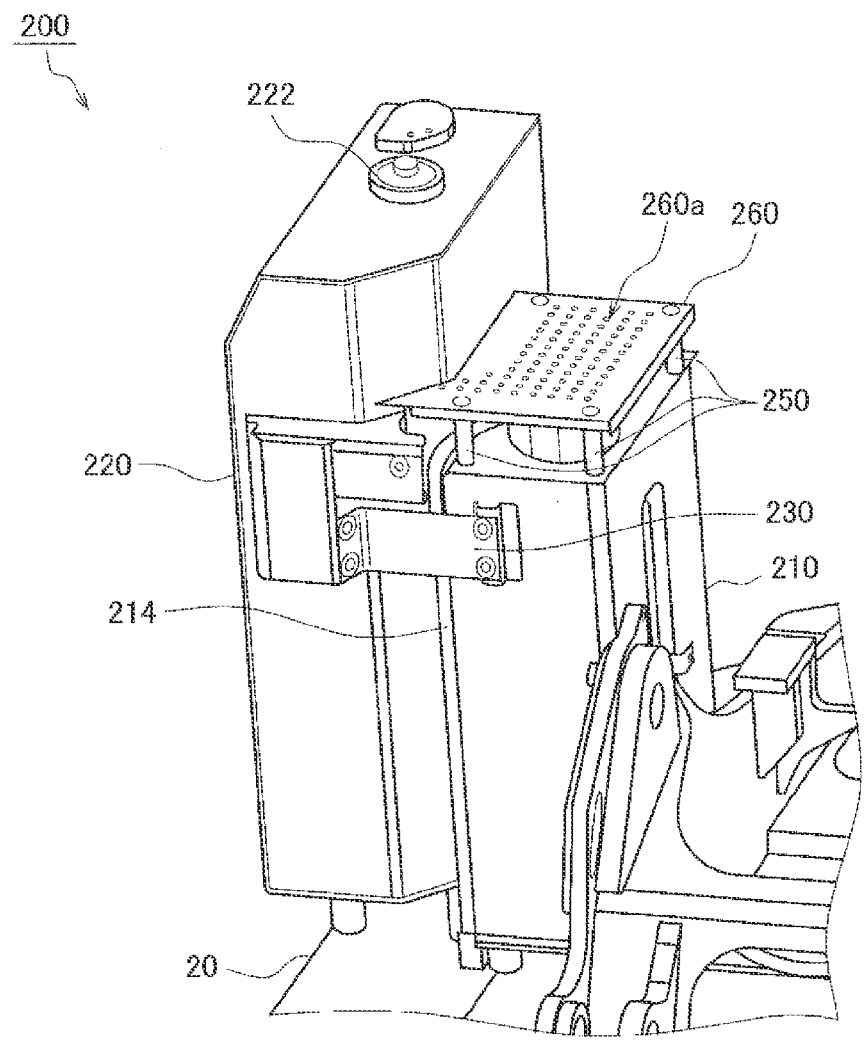
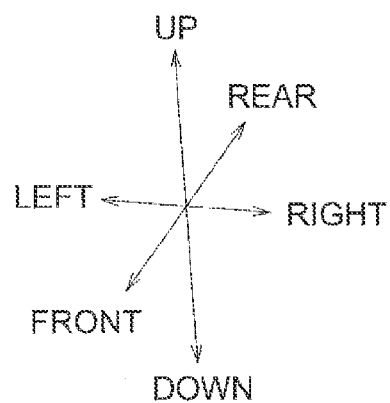
FIG. 11

OIL STORAGE TANK AND CONSTRUCTION VEHICLE

CROSS-REFERENCE TO RELATED APPLICATIONS

This application claims priority to Japanese Patent Application Nos. 2011-045618 and 2011-045619 filed on Mar. 2, 2011, the disclosure of which is hereby incorporated herein by reference in its entirety.

TECHNICAL FIELD

The present invention relates to an oil storage tank comprising a step, and to a construction vehicle comprising the oil storage tank.

BACKGROUND ART

Hydraulic excavators and other construction vehicles typically comprise a fuel oil tank for storing fuel oil, and a hydraulic oil tank for storing hydraulic oil. A technique is widely used in which the fuel oil tank and the hydraulic oil tank are integrally coupled to constitute an "oil storage tank," whereby the rigidity of each of the two tanks is mutually improved.

A technique has been proposed in which the upper face of the oil storage tank is recessed along the longitudinal direction to thereby form a step in the oil storage tank (see Japanese Laid-open Patent Application No. 2010-47975). In accordance with this technique, the position of the step can be lowered and a worker can more easily place his/her foot on the step.

SUMMARY

Nevertheless, in the technique of Japanese Laid-open Patent Application No. 2010-47975, when a worker places a foot on the step from the front of the oil storage tank, the tip of the foot readily catches on the corner of the upper part of the convex part positioned on the lateral part of the step. There is accordingly a problem in that the worker may have difficulty gaining footing on the step.

The present invention was devised in view of the foregoing problems, it being an object thereof to provide an oil storage tank that can improve footing on the step, and to provide a construction vehicle comprising the oil storage tank.

The oil storage tank according to a first aspect of the present invention comprises: a step having a placement face; a first tank part disposed below the step, the first tank part supporting the step; and a second tank part coupled to the first tank part, the second tank part having an upper face, a lower face, a first side face, a second side face and a recessed section, the upper face provided above the placement face, the lower face provided opposite of the upper face, the first side face facing the first tank part and communicating with the upper face and the lower face, the second side face communicating with the upper face, the lower face and the first side face, and the recessed section formed by a sloped face provided to a corner portion at which the upper face, the first side face and the second side face intersect.

In accordance with the oil storage tank of the first aspect of the present invention, a recessed section is formed in a corner portion at the upper end on the first tank part-side of the second tank part. Accordingly, a worker can gain footing on the step while the feet pass through the recessed section when mounting the step. Therefore, the feet can be kept from catching on the corner portion of the second tank part and the footing on the step can therefore be improved.

The oil storage tank according to a second aspect of the present invention is the oil storage tank according to the first aspect, wherein the first tank part is a hydraulic oil tank configured to store hydraulic oil; and the second tank part is a fuel oil tank configured to store fuel oil.

In accordance with the oil storage tank of the second aspect of the present invention, the configuration of the hydraulic oil tank and the fuel oil tank can be made more simple than with the case in which the hydraulic oil tank or the fuel oil tank straddles both the first tank part and the second tank part. Accordingly, the cost of manufacturing the oil storage tank can be reduced.

The oil storage tank according to a third aspect of the present invention is the oil storage tank according to the first or second aspect, wherein a lower end of the recessed section is positioned below the placement face in the vertical direction.

In accordance with the oil storage tank of the third aspect of the present invention, the recessed section is deeper, and footing on the step can therefore be further improved.

The oil storage tank according to a fourth aspect of the present invention is the oil storage tank according to any of the first through third aspects, wherein the sloped face is a planar face.

In accordance with the oil storage tank of the fourth aspect of the present invention, it is possible to improve the footing on the step as well as ensure the capacity of the oil storage tank in comparison with the case in which the sloped face is a curved face.

The oil storage tank according to a fifth aspect of the present invention is the oil storage tank according to any of the first through fourth aspects, wherein the step has an elongated portion being elongated into the recessed section.

In accordance with the oil storage tank of the fifth aspect of the present invention, it is possible to further improve the footing on the step and to improve work efficiency on the step because the face area of the step can be increased.

The oil storage tank according to a sixth aspect of the present invention is the oil storage tank according to the second aspect, comprising: a breather valve disposed on the first tank part; and a breather hose having an end portion and an accommodated portion, the end portion connected to the breather value and disposed above the first tank part, and the accommodated portion communicating with the end portion and accommodated in the recessed section.

In accordance with the oil storage tank of the sixth aspect of the present invention, there is no need to obtain space for drawing the breather hose around the outer periphery of the oil storage tank in comparison with the case in which the breather hose is disposed along the outer face of the oil storage tank. Accordingly, the space in which the oil storage tank is disposed can be reduced.

The construction vehicle according to a seventh aspect of the present invention comprises: a working unit; an engine; and an oil storage tank disposed in front of the engine, the oil storage tank including a step, a first tank part and a second tank part, the step having a placement face for placing a foot, the first tank part disposed below the step, the first tank part supporting the step, the first tank part disposed below the step; and the second tank part coupled to the first tank part, the second tank part having an upper face, a lower face, a first side face, a second side face and a recessed section, the upper face provided above the placement face, the lower face provided opposite of the upper face, the first side face facing the first tank part and communicating with the upper face and the lower face, the second side face communicating with the upper face, the lower face and the first side face, and the recessed section formed by a sloped face provided to a corner portion at which the upper face, the first side face and the second side face intersect.

In accordance with the construction vehicle of the seventh aspect of the present invention, the recessed section is formed at a corner portion of the upper end of the first tank part-side of the second tank part. Accordingly, the worker can gain footing on the step while the feet passes through the recessed section when the worker mounts the step. It is therefore possible to improve the footing on the step because the foot can be kept from catching on the corner portion of the second tank part.

The construction vehicle according to an eighth aspect of the present invention is the construction vehicle according to the seventh aspect, wherein the first tank part is a hydraulic oil tank configured to store hydraulic oil to be fed to the working unit; and the second tank part is a fuel oil tank configured to store fuel oil to be fed to the engine.

In accordance with the construction vehicle of the eighth aspect of the present invention, the configuration of the hydraulic oil tank and the fuel oil tank can be made simpler than a case in which the hydraulic oil tank or the fuel oil tank straddles both the first tank part and the second tank part. Accordingly, the cost of manufacturing the oil storage tank can be reduced.

The construction vehicle according to a ninth aspect of the present invention is the construction vehicle according to the seventh or eighth aspect, wherein a lower end of the recessed section is positioned below the placement face in the vertical direction.

In accordance with the construction vehicle of the ninth aspect of the present invention, the recessed section is deeper, and footing on the step can therefore be further improved.

The construction vehicle according to a tenth aspect of the present invention is the construction vehicle according to the any of the seventh through ninth aspects, wherein the sloped face is a planar face.

In accordance with the construction vehicle of the tenth aspect of the present invention, it is possible to improve the footing on the step as well as ensure the capacity of the oil storage tank in comparison with the case in which the sloped face is a curved face.

The construction vehicle according to an eleventh aspect of the present invention is the construction vehicle according to the any of the seventh through tenth aspects, wherein the step has an elongated portion being elongated into the recessed section.

In accordance with the construction vehicle of the eleventh aspect of the present invention, it is possible to further improve the footing on the step and to improve work efficiency on the step because the face area of the step can be increased.

The construction vehicle according to a twelfth aspect of the present invention is the construction vehicle according to the any of the seventh through eleventh aspects, wherein the working unit has a hydraulic hose disposed in front of the step, the sloped face faces the hydraulic hose.

In accordance with the construction vehicle of the twelfth aspect of the present invention, space through which the worker's feet pass can be more reliably ensured between the oil storage tank and the hydraulic oil hoses.

The construction vehicle according to a thirteenth aspect of the present invention is the construction vehicle according to the eighth aspect, comprising: a breather valve disposed on the first tank part; and a breather hose having an end portion and an accommodated portion, the end portion connected to the breather value and disposed above the first tank part, and the accommodated portion communicating with the end portion and accommodated in the recessed section.

In accordance with the construction vehicle of the thirteenth aspect of the present invention, there is no need to obtain space for drawing the breather hose around the outer periphery of the oil storage tank in comparison with the case in which the breather hose is disposed along the outer face of the oil storage tank. Accordingly; the space in which the oil storage tank is disposed can be reduced.

The oil storage tank according to a fourteenth aspect of the present invention comprises: a hydraulic oil tank configured to store hydraulic oil; a fuel oil tank configured to store fuel oil; a breather valve disposed on the hydraulic oil tank; and a breather hose connected to the breather valve, the hydraulic oil tank including a first facing face facing the fuel oil tank; the fuel oil tank including a second facing face facing the hydraulic oil tank; the second facing face having a fuel-oil-tank adjacent face and a fuel-oil-tank sloped face, the fuel-oil-tank adjacent face extending along the hydraulic oil tank, and the fuel-oil-tank sloped face communicating with the fuel-oil-tank, adjacent face and sloping relative to the fuel-oil-tank adjacent face so as to be away from the hydraulic oil tank; and the breather hose disposed along the fuel-oil-tank sloped face.

There are known techniques for providing a breather valve to the upper face of the hydraulic oil tank in order to adjust the amount of air inside the hydraulic oil tank in accordance with the rise and fall of the fluid face the hydraulic oil (e,g., Japanese Laid-open Patent Application Nos. 2006-46016 and 2007-177501). However, with such techniques, gravel and/or dust are liable to penetrate the interior of the hydraulic oil tank via the breather valve. In view of the above, a technique has been proposed for attaching the breather hose to the breather valve and drawing the breather hose along the side face of the hydraulic oil tank (Japanese Laid-open Patent Application No. 2009-30346). However, there is a problem with such a technique in that the space for drawing the breather hose around must be obtained in the vicinity of the hydraulic oil tank, and the space for disposing the oil storage tank overall increases.

On the other hand, in accordance with the oil storage tank of the fourteenth aspect of the present invention, the breather hose can be accommodated along the fuel-oil-tank sloped face. Accordingly, there is no need to obtain space for drawing the breather hose around the periphery of the oil storage tank. As a result, the space for disposing the oil storage tank can be reduced.

The oil storage tank according to a fifteenth aspect of the present invention is the construction vehicle according to the fourteenth aspect, wherein the fuel-oil-tank sloped face communicates with an upper face and a lower face of the fuel oil tank.

In accordance with the fifteenth aspect of the present invention, the external shape of the oil storage tank can be made simpler than a case in which the fuel-oil-tank sloped face is discontinuous in the vertical direction. Accordingly; the cost of manufacturing the oil storage tank can be reduced.

The oil storage tank according to a sixteenth aspect of the present invention is the construction vehicle according to the fourteenth or fifteenth aspect, wherein the breather hose has a first end portion coupled to the breather valve, and a second end portion disposed lower than the oil storage tank.

In accordance with the oil storage tank of the sixteenth aspect of the present invention, it is possible to minimize soiling of the oil storage tank by the hydraulic oil contained in the air that flows from the second end portion.

The oil storage tank according to a seventeenth aspect of the present invention is the construction vehicle according to any of the fourteenth to sixteenth aspects, wherein the first facing face having a hydraulic-oil-tank adjacent face and a hydraulic-oil-tank sloped face, the hydraulic-oil-tank adjacent face extending along the fuel oil tank, and the hydraulic-oil-tank sloped face communicating with the hydraulic-oil-tank adjacent face and sloping relative to the hydraulic-oil-tank adjacent face so as to be away from the fuel oil tank; and the breather hose disposed between the fuel-oil-tank sloped face and the hydraulic-oil-tank sloped face.

In accordance with the oil storage tank of the seventeenth aspect of the present invention, space for accommodating the breather hose can be readily obtained.

The oil storage tank according to an eighteenth aspect of the present invention is the construction vehicle according to any of the fourteenth to seventeenth aspects, wherein the hydraulic oil tank is disposed on the vehicle-body-interior side of the fuel oil tank.

In accordance with the oil storage tank of the eighteenth aspect of the present invention, it is possible to minimize the possibility that the worker moving on the step will errantly take a misstep off the step.

The oil storage tank according to a nineteenth aspect of the present invention comprises: a hydraulic oil tank configured to store hydraulic oil; a fuel oil tank configured to store fuel oil; a breather valve disposed on the hydraulic oil tank; and a breather hose connected to the breather valve, the hydraulic oil tank including a first facing face facing the fuel oil tank; the fuel oil tank including a second facing face facing the hydraulic oil tank; the first facing face having a hydraulic-oil-tank adjacent face and a hydraulic-oil-tank sloped face, the hydraulic-oil-tank adjacent face extending along the fuel oil tank, and the hydraulic-oil-tank sloped face communicating with the hydraulic-oil-tank adjacent face and sloping relative to the hydraulic-oil-tank adjacent face so as to be away from the fuel oil tank; and the breather hose disposed along the hydraulic-oil-tank sloped face.

In accordance with the oil storage tank of the nineteenth aspect of the present invention, the breather hose can be accommodated along the hydraulic-oil-tank sloped face in the same manner as the oil storage tank according to the first aspect. Accordingly, there is no need to obtain space for drawing the breather hose around the periphery of the oil storage tank. As a result, the space in which the oil storage tank is disposed can be reduced.

The construction vehicle according to a twentieth aspect of the present invention comprises: the oil storage tank recited in any of the fourteenth to nineteenth aspects; a working unit configured to receive supply of the hydraulic oil from the hydraulic oil tank; and an engine configured to receive supply of the fuel oil from the fuel oil tank.

The construction vehicle according to a twenty-first aspect of the present invention is the construction vehicle according to the twentieth aspect, comprising a working unit configured to receive supply of the hydraulic oil from the hydraulic oil tank; and an engine configured to receive supply of the fuel oil from the fuel oil tank.

In accordance with the construction vehicle according to the twenty-first aspect of the present invention, it is possible to minimize damage (including melting) by heat released from the exhaust gas treatment device. As a result, it is possible to eliminate the need to separately provide a heat shield material fur guarding the breather hose.

The construction vehicle according o a twenty-second aspect of the present invention is the construction vehicle according to the twentieth or twenty-first aspect, wherein a rear end of the hydraulic oil tank is positioned further forward than a rear end of the fuel oil tank in the longitudinal direction.

In accordance with the construction vehicle of the twenty-second aspect of the present invention, space for disposing the exhaust gas treatment device is more readily obtained rearward of the hydraulic oil tank.

The construction vehicle according to a twenty-third aspect of the present invention is the construction vehicle according to any of the twentieth to twenty-second aspects, wherein the oil storage tank includes a step disposed above the hydraulic oil tank.

In accordance with the construction vehicle of the twenty-third aspect of the present invention, the worker uses the step as a platform, whereby the work of fueling the oil storage tank and/or the movement on the oil storage tank are facilitated.

The construction vehicle according to a twenty-fourth aspect of the present invention is the construction vehicle according to the twenty-third aspect, wherein an upper face of the step is lower than an upper face of the fuel oil tank in the vertical direction.

In accordance with the construction vehicle of the twenty-fourth aspect of the present invention, a vertical difference is provided between the fuel oil tank upper face and the upper face of the step, whereby the vertical difference serves as a fence and it is possible to minimize missteps off the step by the worker.

The construction vehicle according to a twenty-fifth aspect of the present invention is the construction vehicle according to the twenty-third or twenty-fourth aspect, wherein the hydraulic oil tank is disposed on the vehicle-body-interior side of the fuel oil tank.

In accordance with the construction vehicle of the twenty-fifth aspect of the present invention, it is possible to minimize the possibility that the worker moving on the step will errantly take a misstep off the step.

EFFECT OF THE INVENTION

In accordance with the present invention, it is possible to provide an oil storage tank that can improve footing on the step, and to provide a construction vehicle comprising the oil storage tank.

BRIEF DESCRIPTION OF THE DRAWINGS

FIG. 11 is a perspective view of the oil storage tank 200 according to the second embodiment as seen from the front upper left;

DESCRIPTION OF EMBODIMENTS

Figure 1:
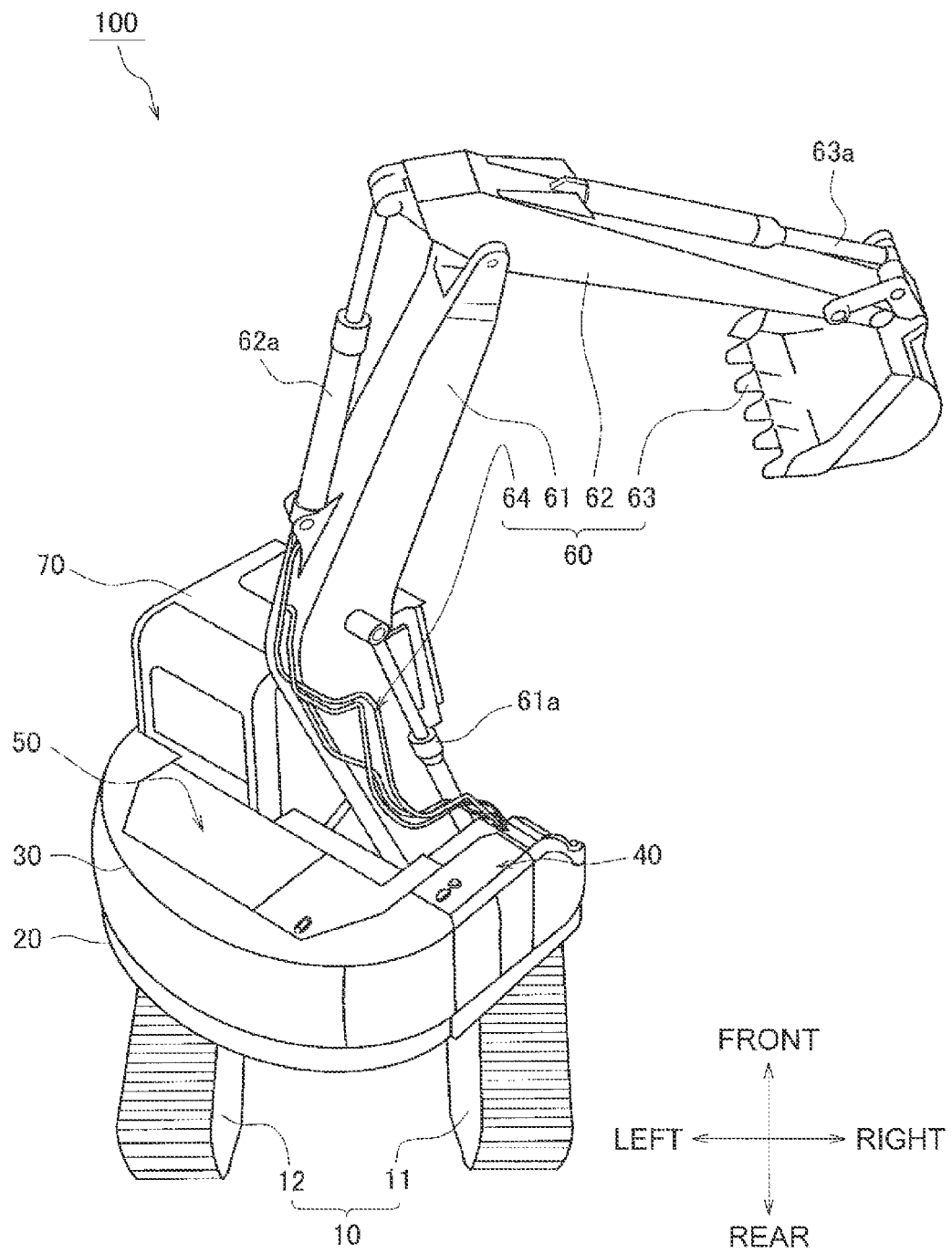
FIG. 1 is a perspective view of the hydraulic excavator 100 according to the first embodiment as seen from the rear upper right.

Next, embodiments of the present invention are described with reference to the drawings. Portions that are the same or similar in the description of the drawings below are given the same or similar reference numerals. However, the drawings are schematic in nature, and the dimensional ratios or other attributes may be different from the actual component. Therefore, specific dimensions and the like should be determined with consideration given to the descriptions below. Also, it is apparent that portions that mutually differ in dimensional relationship and/or ratio are included among the drawings.

First Embodiment

Configuration of Construction Vehicle

Figure 2:
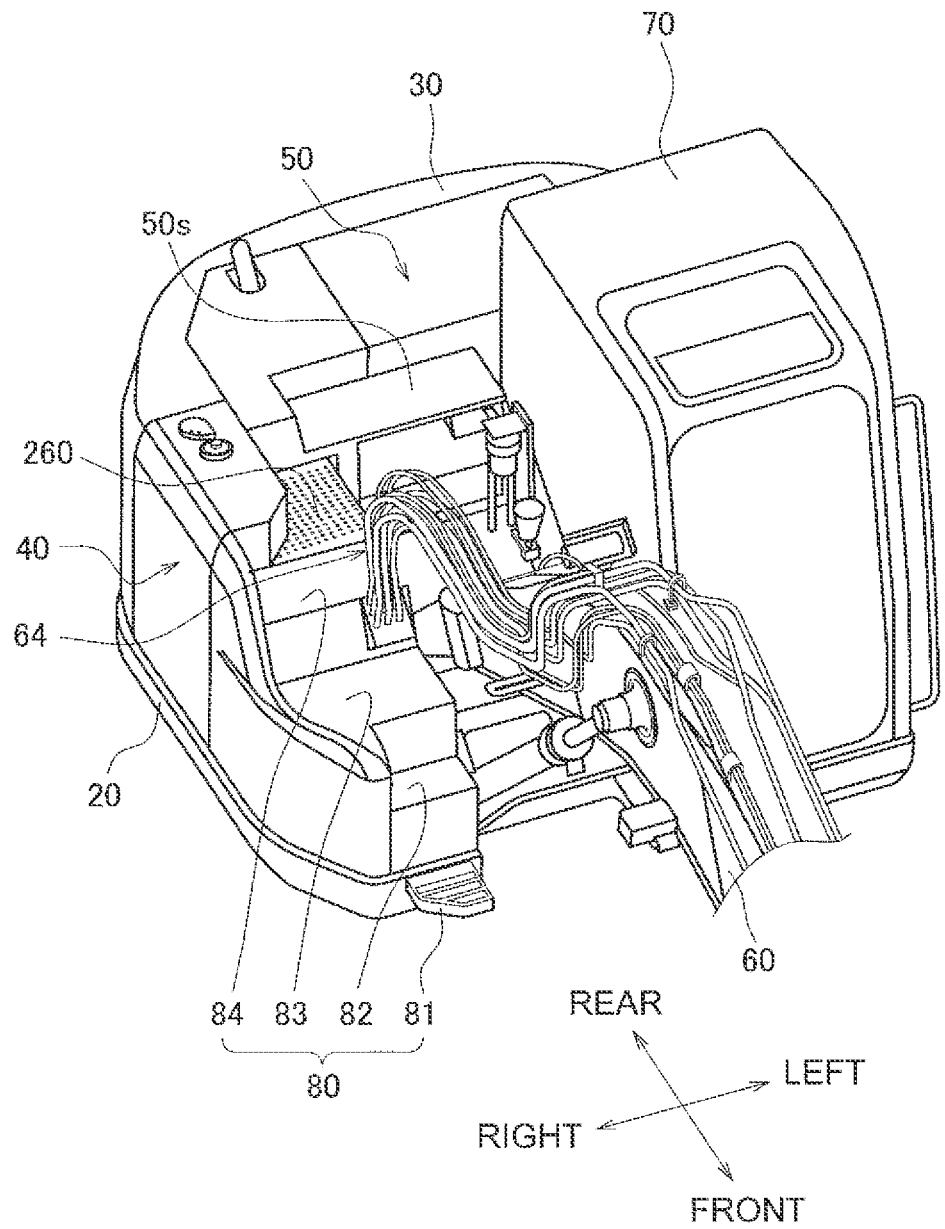
FIG. 2 is a perspective view of the hydraulic excavator 100 according to the first embodiment as seen from the front upper right.

The configuration of the construction vehicle according to the first embodiment will be described with reference to the drawings. In the present embodiment, a hydraulic excavator will be described as an example of a construction vehicle. FIG. 1 is a perspective view of the hydraulic excavator 100 according to the first embodiment as seen from the rear upper right. FIG. 2 is a perspective view of the hydraulic excavator 100 according to the first embodiment as seen from the front upper right.

The hydraulic excavator 100 comprises a lower travel body 10, a swivel platform 20, a counterweight 30, a machine compartment 40, an engine compartment 50, a working unit 60, a cab 70, and stairs 80.

The hydraulic excavator 100 according to the present embodiment is a so-called "hydraulic excavator with a small rear swivel radius (Japanese Industrial Standards definition (HS A 8340-4))."

The lower travel body 10 has a pair of crawler belts 11, 12 capable of mutually independent rotation. A pair of crawler belts lit, 12 is rotated, whereby the hydraulic excavator 100 moves left, right, forward, and backward.

The swivel platform 20 is swivelably supported on the lower travel body 10. The swivel platform 20 constitutes the vehicle body frame of the hydraulic excavator 100. The counterweight 30, the engine compartment 50, the machine compartment 40, the working unit 60, and the cab 70 are disposed on the swivel platform 20.

The counterweight 30 is disposed behind the engine compartment 50. The counterweight 30 is formed by placing, e.g., scrap iron and/or concrete, or the like in a box assembled from steel plates. The counterweight 30 is used for maintaining vehicle body balance during excavation work or the like.

The machine compartment 40 is disposed in front of the engine compartment 50. The machine compartment 40 accommodates a later-described oil storage tank 200 (see FIG. 3). A step 260 (an example of "step member") is provided to the machine compartment 40, as shown in FIG. 2. The step 260 is a platform mounted by a worker when work such as fueling the oil storage tank 200 is performed. The configuration of the oil storage tank 200 is later described.

The engine compartment 50 is disposed behind the machine compartment 40. The engine compartment 50 accommodates an engine and/or an exhaust gas treatment device, and the like (not shown). A maintenance platform 50S is provided to the engine compartment 50, as shown in FIG. 2. The maintenance platform 50S is a platform mounted by a worker during maintenance inside the engine compartment 50.

The working unit 60 is attached to the swivel platform 20 in front of the machine compartment 40. The working unit 60 has a boom 61, an arm 62 attached to the distal end of the boom 61, a bucket 63 attached to the distal end of the arm 62, and a hydraulic hose 64. Hydraulic oil is fed to hydraulic cylinders 61a, 62a, 63a, whereby the boom 61, the arm 62, and the bucket 63 are driven. Hydraulic hoses 64 constitute oil channels for feeding hydraulic oil to the hydraulic cylinders 62a, 63a. The hydraulic hoses 64 are disposed in front of the step 260, as shown in FIG. 2.

The cab 70 is a driver's cabin in which the worker of the hydraulic excavator 100 rides. The cab 70 is provided in front of the engine compartment 50 and to the side of the working unit 60 so as to allow the worker to view the motions of the working unit 60.

The stairs 80 are disposed in front of the machine compartment 40. The stairs 80 are stairs that the worker ascends and descends during work for feeding fuel to the oil storage tank 200 and/or during maintenance inside the engine compartment 50. The stairs 80 have a first stair 81, a second stair 82, a third stair 83, and a fourth stair 84. The fourth stair 84 extends to the step 260.

Configuration of Oil Storage Tank

Figure 3:
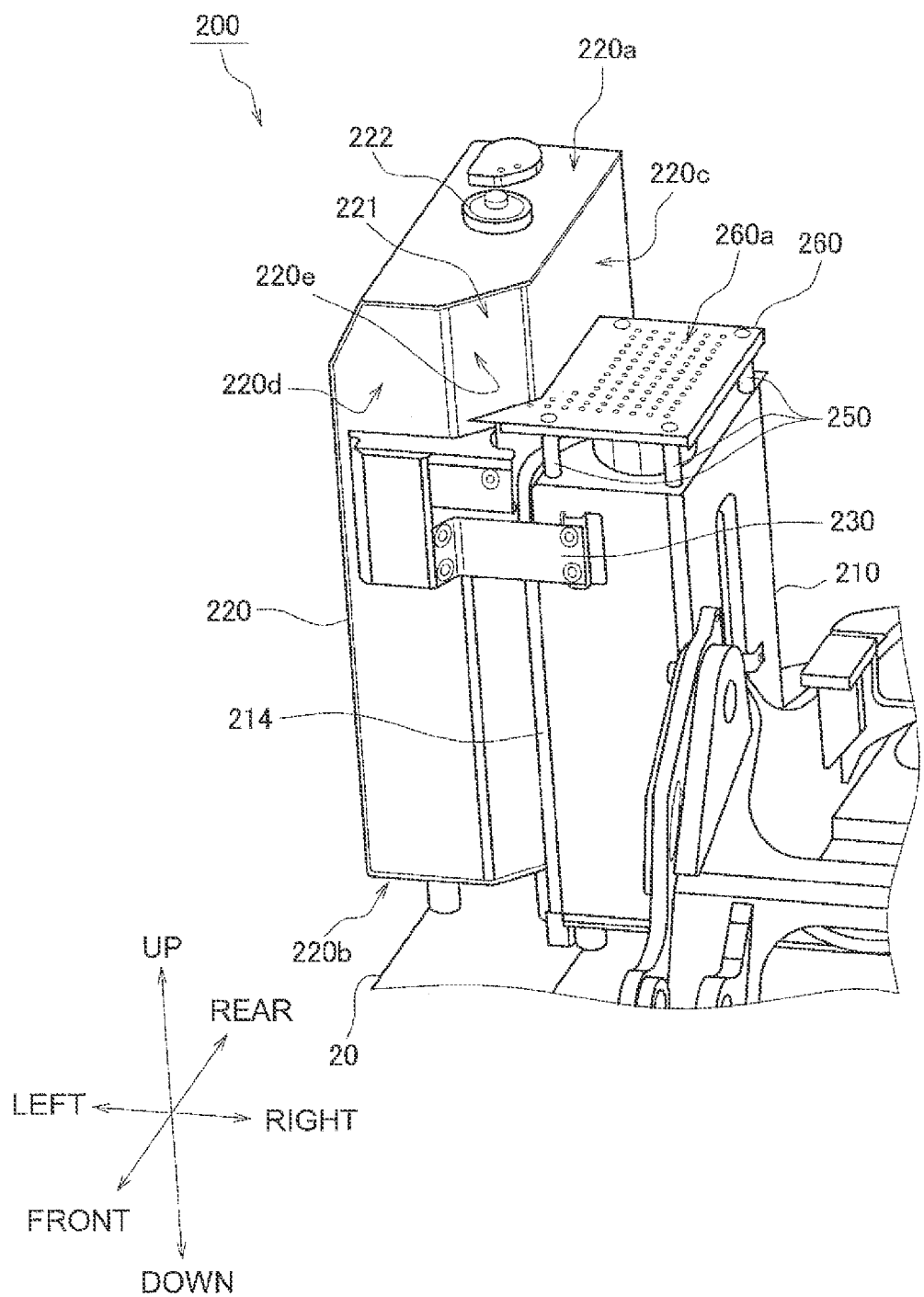
FIG. 3 is a perspective view of the oil storage tank 200 according to the first embodiment as seen from the front upper left.
Figure 4:
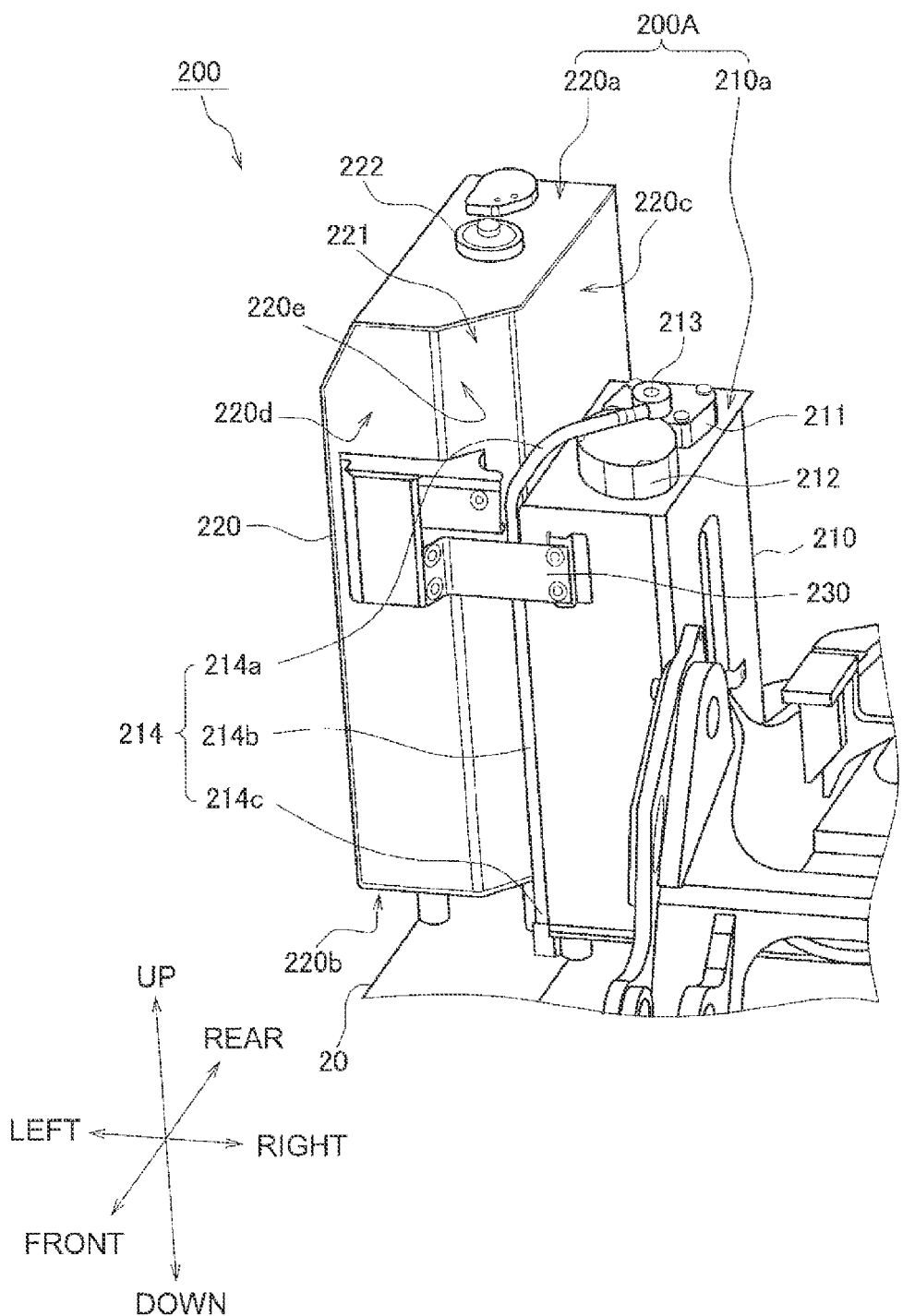
FIG. 4 is a perspective view of the main body of the oil storage tank 200 according to the first embodiment as seen from the front upper left.
Figure 5:
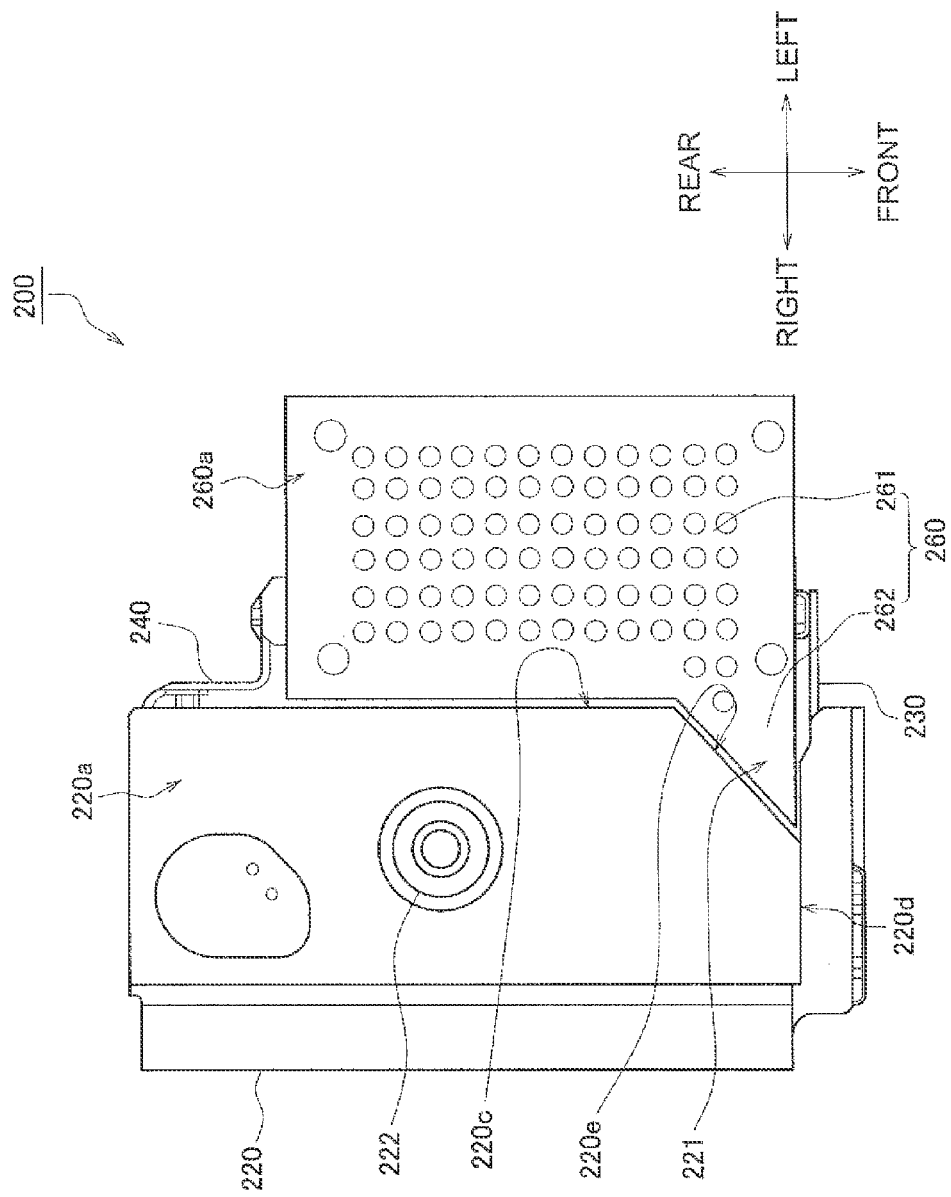
FIG. 5 is a top view of the oil storage tank 200 according to the first embodiment as seen from above.

The configuration of the oil storage tank 200 according to the first embodiment is next described with reference to the drawings. FIG. 3 is a perspective view of the oil storage tank 200 according to the first embodiment as seen from the front upper left. FIG. 4 is a perspective view of the main body of the oil storage tank 200 according to the first embodiment as seen from the front upper left. FIG. 5 is a top view of the oil storage tank 200 according to the first embodiment as seen from above.

The oil storage tank 200 has a hydraulic oil tank 210 (an example of the "first tank part"), a fuel oil tank 220 (an example of the "second tank part"), a first coupling member 230, a second coupling member 240, a plurality of step support members 250, and a step 260. The hydraulic oil tank 210 and the fuel oil tank 220 are integrally coupled by the first coupling member 230 and the second coupling member 240 to thereby constitute a "tank main body" of the oil storage tank 200.

Hydraulic Oil Tank

The hydraulic oil tank 210 is secured to the top of the swivel platform 20. The hydraulic oil tank 210 stores hydraulic oil to be fed to the working unit 60. The hydraulic oil tank 210 supports the step 260 via the plurality of step support members 250. The upper end of the hydraulic oil tank 210 is positioned below the upper end of the fuel oil tank 220 in the vertical direction. In the first embodiment, the hydraulic oil tank 210 constitutes the "first tank part" for supporting the step 260.

The hydraulic oil tank 210 has a maintenance lid 211, a fitter device 212, a breather valve 213, and a breather hose 214, as shown in FIG. 4.

The maintenance lid 211 is detachably attached to the upper face of the hydraulic oil tank. 210. Detaching the maintenance lid 211 allows a strainer disposed inside the hydraulic oil tank 210 to be exchanged.

The filter device 212 is detachably attached to the upper face of the hydraulic oil tank 210. The filter device 212 filters abrasion dust and the like that contaminates the hydraulic oil flowing to the hydraulic oil tank 210.

The breather valve 213 is disposed on the hydraulic oil tank 210 (on the maintenance lid 211 in the first embodiment). The breather valve 213 adjusts the amount of air inside the hydraulic oil tank 210 in accordance with the rise and fall of the fluid face the hydraulic oil. In other words, air flows out from the hydraulic oil tank 210 via the breather valve 213 when the fluid face of the hydraulic oil rises, and air flows into the hydraulic oil tank 210 via the breather valve 213 when the fluid face of the hydraulic oil falls.

The breather hose 214 is a tube through which air flows into or out from the breather valve 213. The breather hose 214 is composed of a first end 214a, an accommodated portion 214b, and a second end portion 214c, as shown in FIG. 4. The first end 214a is connected to the breather valve 213 and is disposed above an upper face 210a of the hydraulic oil tank. The accommodated portion 214b extends to the first end 214a and is accommodated inside a later-described recessed section 221. The second end portion 214c extends to the accommodated portion 214h and is disposed near the lower end of the hydraulic oil tank 210.

Fuel Oil Tank

The fuel oil tank 220 is secured to the top of the swivel platform 20. The fuel oil tank 220 stores fuel oil to be fed to the engine. The upper end of the fuel oil tank 220 is positioned above the upper end of the hydraulic oil tank 210 in the vertical direction. The fuel oil tank 220 constitutes the "second tank part" coupled to the hydraulic oil tank 210 (an example of the "first tank part").

The fuel oil tank 220 has an upper face 220a, a lower face 220b, a first side face 220c (an example of the "first side face"), a second side face 220d. (an example of the "second side face"), a sloped face 220e, a recessed section 221, and a fueling port 222, as shown in FIG. 3.

The upper face 220a is positioned above the placement face 260a of the later-described step 260. The lower face 220b is provided opposite from the upper face 220a and faces the swivel platform 20. The first side face 220c communicates with the upper face 220a and the lower face 220b, and faces the hydraulic oil tank 210 (an example of the "first tank part"). The second side face 220d communicates with the upper face 220a, the lower face 220b, and the first side face 220c. In the first embodiment, the first side face 220c is a left side face of the fuel oil tank 220 and the second side face 220d is a front face of the fuel oil tank 220.

The sloped face 220e is the side face among the plurality of side faces of the fuel oil tank 220 that form the recessed section 221. The sloped face 220e communicates with the upper face 220a, the first side face 220c, and the second side face 220d. In the first embodiment, the sloped face 220e is a planar face. The sloped face 220e faces the hydraulic hoses 64 of the working unit 60 (see FIG. 2). A gap between the sloped face 220e and the hydraulic hoses 64 is, e.g., about 30 cm, but no limitation is imposed thereby.

The recessed section 221 is formed by providing the sloped face 220e to a corner portion at which the upper face 220a, the first side face 220c, and the second side face 220d. intersect. In the first embodiment, the recessed section 221 is formed by the sloped face 220e of the fuel oil tank 220, and the side face of the hydraulic oil tank 210 opposing the sloped face 220e. In the first embodiment, the recessed section 221 is provided in continuous fashion from the upper face 220a to the lower face 220b. Therefore, the lower end of the recessed section 221 is positioned below a later-described placement face 260a of the step 260.

The fueling port 222 is provided above the upper face 220a of the fuel oil tank. Fuel oil is replenished from the fueling port 222.

Step

The step 260 is a platform on which the worker mounts during work for refueling the oil storage tank 200 and/or during maintenance inside the engine compartment 50. The step 260 is supported on the hydraulic oil tank 210 (an example of the "first tank part") via the plurality of step support members 250. The step 260 has a placement face 260a, a base portion 261, and an elongated portion 262.

The placement face 260a is the upper face of the step 260. The placement face 260a is formed by the base portion 261 and the elongated portion 262. The foot of the worker is placed on the placement face 260a. The base portion 261 is disposed above the hydraulic oil tank 210. The elongated portion 262 is elongated into the recessed section 221 from the base portion 261. The elongated portion 262 is disposed between the base portion 261 and the sloped face 220e of the recessed section 221.

Operation and Effect (1) The oil storage tank 200 according to the first embodiment comprises a hydraulic oil tank 210 (an example of the "first tank part"), a fuel oil tank 220 (an example of the "second tank part"), and a step 260. The hydraulic oil tank 210 supports the step 260. The fuel oil tank 220 has a recessed section 221 funned by providing a sloped face 220e to a corner portion at which a upper face 220a, a first side face 220c, and a second side face 220d intersect.

In this manner, in accordance with the oil storage tank 200 of the first embodiment, the recessed section 221 is formed in the corner portion on hydraulic oil tank 210-side of the fuel oil tank 220. Accordingly, the worker can gain footing on the step 260 while the feet pass through the recessed section when mounting the step. Therefore, the ease of gaining footing on the step 260 can be improved because the feet can be kept from catching on the corner portion of the fuel oil tank 220.

The capacity of the fuel oil tank 220 can be kept from being reduced in comparison with the case in which the width of the fuel oil tank 220 is reduced in the lateral direction to thereby increase the width of the step 260.

(2) In the oil storage tank 200 according to the first embodiment, the hydraulic oil tank 210 constitutes the first tank part and the fuel oil tank 220 constitutes the second tank part.

Therefore, the configuration of the hydraulic oil tank 210 and the fuel oil tank 220 can be made simpler than a case in which the hydraulic oil tank 210 or the fuel oil tank 220 straddles both the first tank part and the second tank part. Accordingly, the cost of manufacturing the oil storage tank 200 can be reduced.

(3) In the oil storage tank 200 according to the first embodiment, the lower end of the recessed section 221 is positioned below the placement face 260a in the vertical direction.

Therefore, it is possible to further improve the footing on the step 260 because the recessed section 221 is deeper.

(4) In the oil storage tank 200 according to the first embodiment, the sloped face 220e of the fuel oil tank 220 is a planar face.

Therefore, it is possible to furthermore improve the footing on the step 260 as well as ensure the capacity of the oil storage tank 200 in comparison with the case in which the sloped face is a curved face.

(5) in the oil storage tank 200 according to the first embodiment, the step 260 has an elongated portion 262 that is elongated into the recessed section 221.

Therefore, it is possible to further improve the footing on the step 260 and to improve work efficiency on the step 260 because the face area of the step 260 can be increased.

(6) in the oil storage tank 200 according to the first embodiment, an accommodated portion 214b of the breather hose 214 is accommodated in the recessed section 221.

Accordingly, there is no need to obtain space for drawing the breather hose 214 around the outer periphery of the oil storage tank 200 in comparison with the case in which the breather hose 214 is disposed along the outer face of the oil storage tank 200. Accordingly, the space in which the oil storage tank 200 is disposed can be reduced.

(7) In the oil storage tank 200 according to the first embodiment, a sloped face 220e provided to a corner portion at which the upper face 220a, the first side face 220c, and the second side face 220d faces the hydraulic hoses 64 disposed in front of the step 260.

In this manner, it is possible to obtain space for the feet of the worker to pass between the oil storage tank 200 and the hydraulic hoses 64 because the sloped face 220e is provided in a position facing the hydraulic hoses 64.

Modification of First Embodiment

The present invention is described by the first embodiment above, but the statements and drawings constituting a portion of this disclosure should not be construed as a limitation of the invention. Various alternate embodiments, examples, and operational techniques are apparent from this disclosure to a person skilled in the art.

Figure 6:
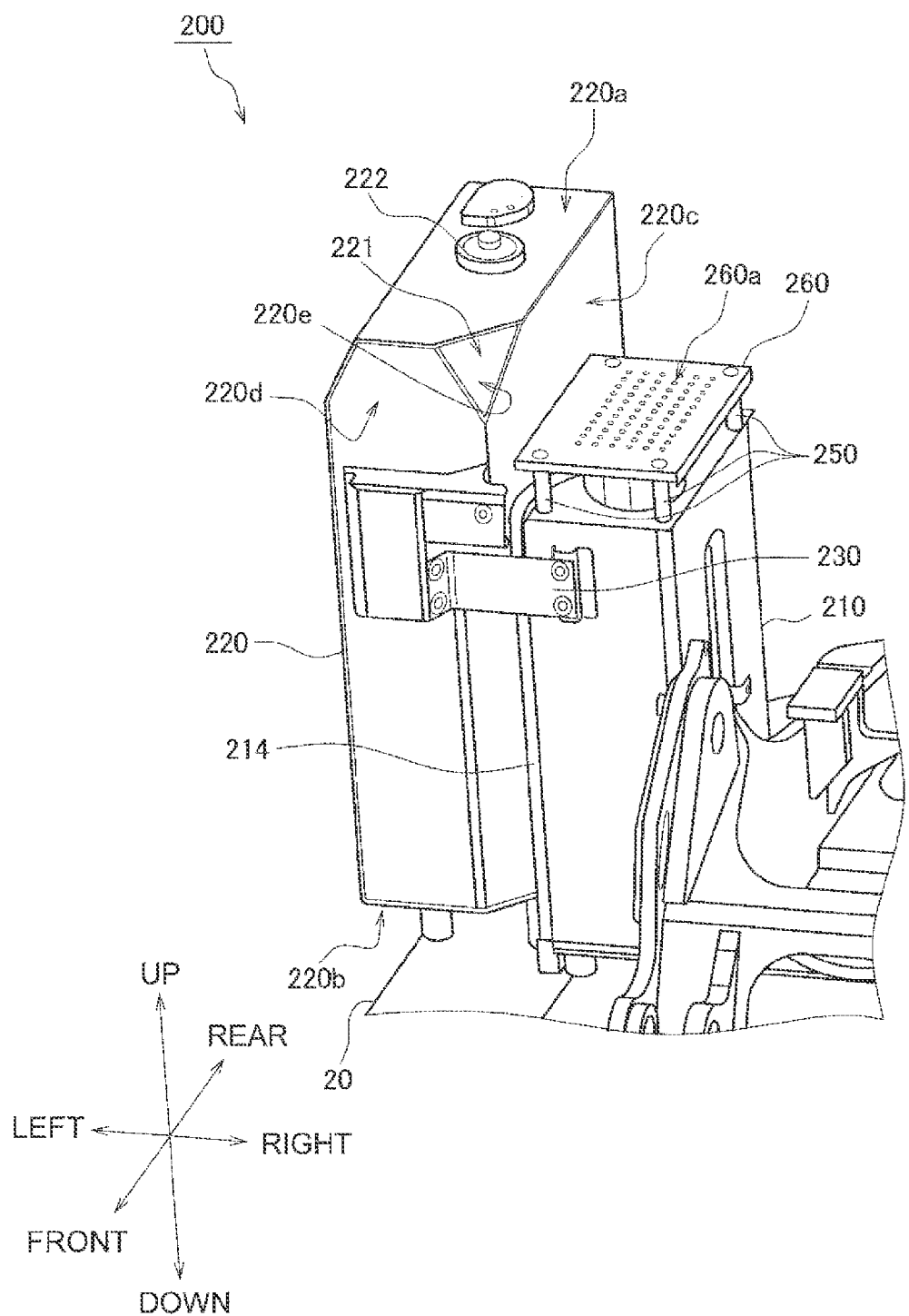
FIG. 6 is a perspective view of the oil storage tank 200 according to the first embodiment as seen from the front upper left.
Figure 7:
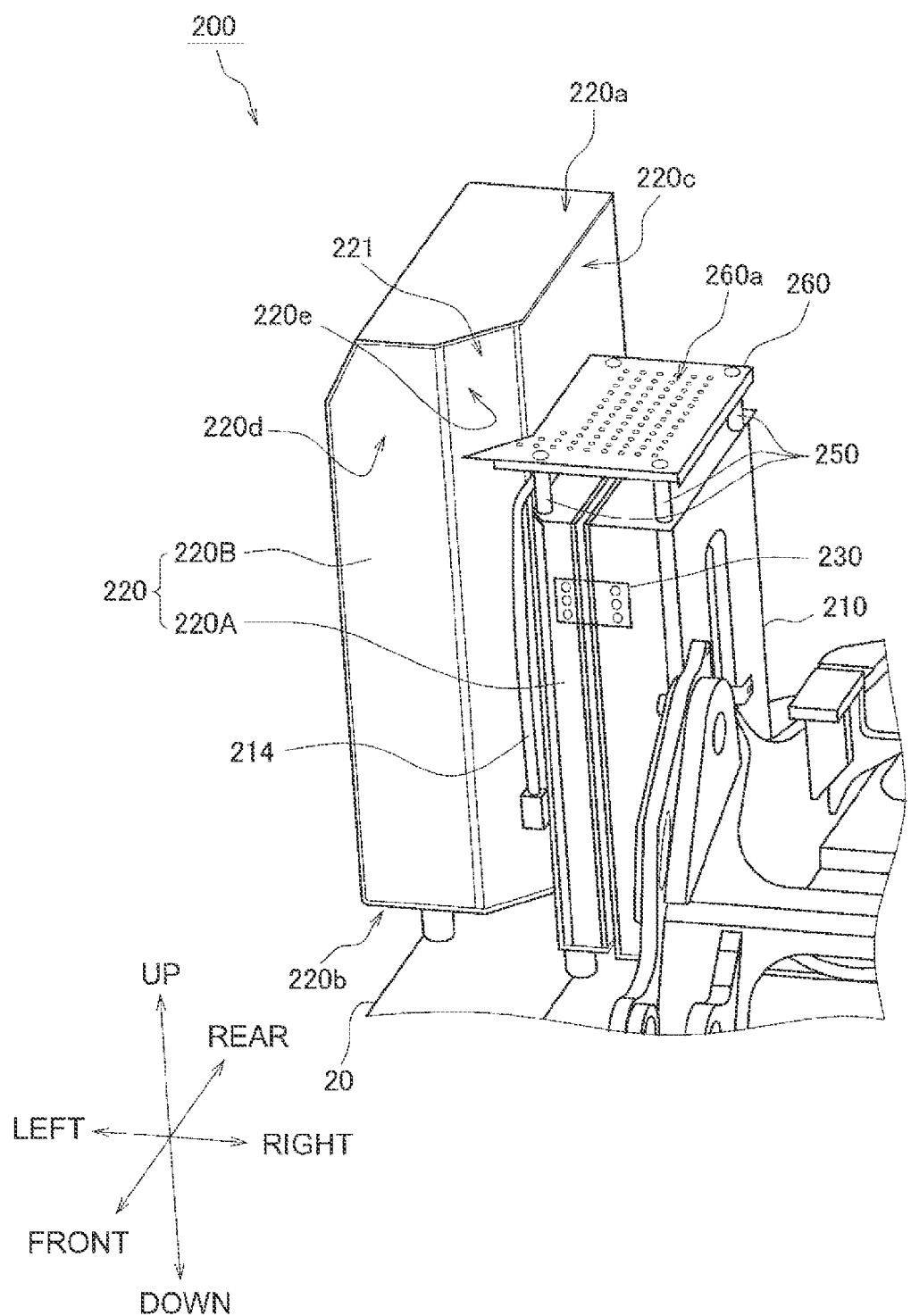
FIG. 7 is a perspective view of the oil storage tank 200 according to the first embodiment as seen from the front upper left.

In the first embodiment, a recessed section 221 communicates with the upper face 220a and the lower face 220b, but no limitation is imposed thereby. The recessed section 221 may be formed by providing the sloped face 220e to a corner portion of the upper face 220a, the first side face 220c, and the second side face 220d, as shown in FIG. 6, and is not required to communicate to the lower face 220b.

In the first embodiment, the step 260 has an elongated portion 262 that is elongated into the recessed section 221, but no limitation is imposed thereby. The step 260 is not required to have an elongated portion 262, as shown in FIG. 6.

In the first embodiment, the hydraulic oil tank 210 constitutes the first tank part, and the fuel oil tank 220 constitutes the second tank part, but no limitation is imposed thereby. For example, the fuel oil tank. 220 and the hydraulic oil tank 210 may be disposed in a reverse configuration.

Figure 8:
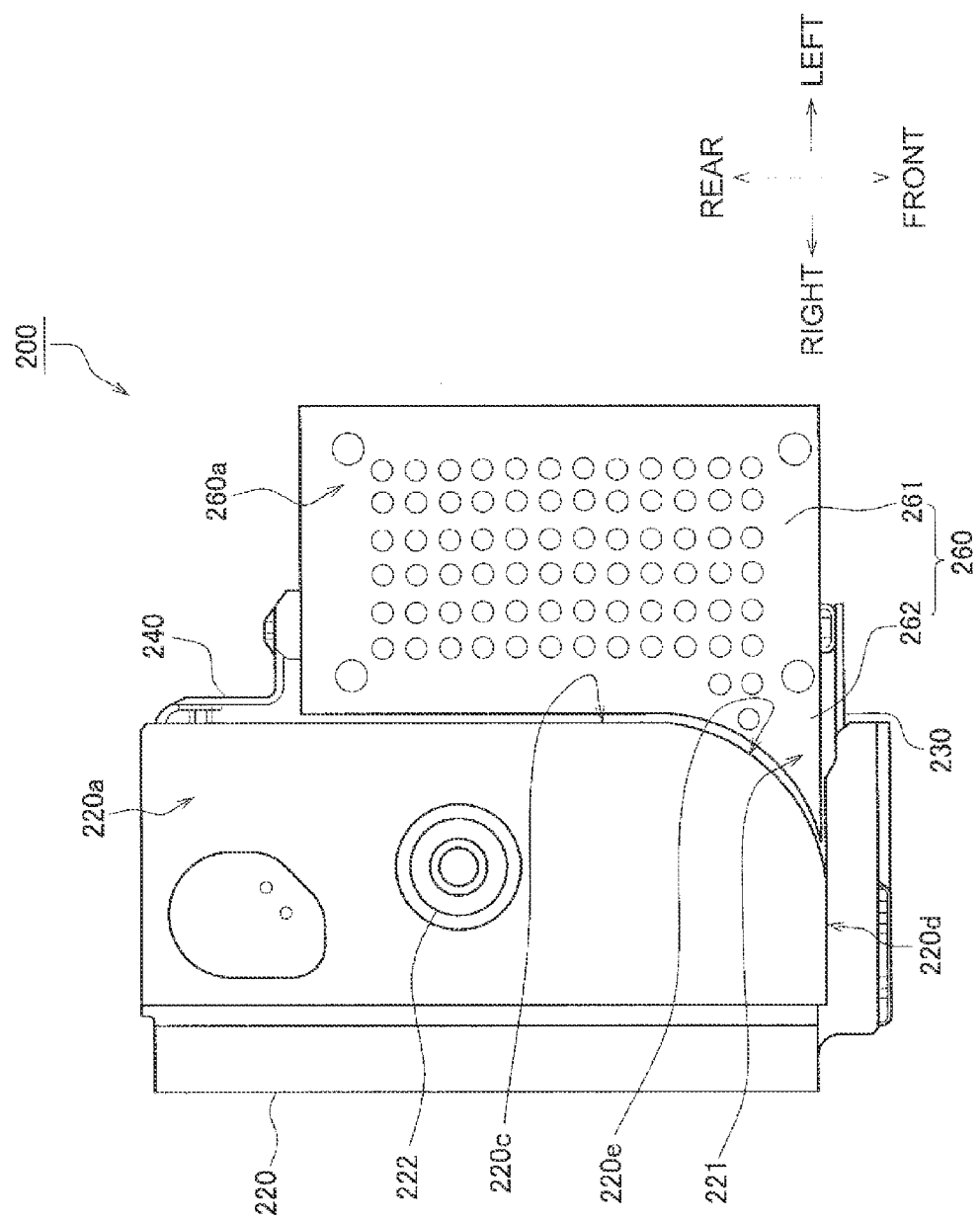
FIG. 8 is a top view of the oil storage tank 200 according to the first embodiment as seen from above.

In the first embodiment above, the sloped face 220e of the recessed section 221 is a planar face, but no limitation is imposed thereby The sloped face 220e of the recessed section 221 may be a curved face, as shown in FIG. 8. In this case, the capacity of the oil storage tank 200 can be further expanded.

In the first embodiment above, the hydraulic excavator 100 is a hydraulic excavator with a small rear swivel radius, but no limitation is imposed thereby.

Second Embodiment

A second embodiment of the present invention is described below with reference to the drawings. However, the configuration of the hydraulic excavator 100 is the same as that of the first embodiment, and the description wilt therefore begin with the internal configuration of the hydraulic excavator 100.

Internal Configuration of Construction Vehicle

Figure 9:
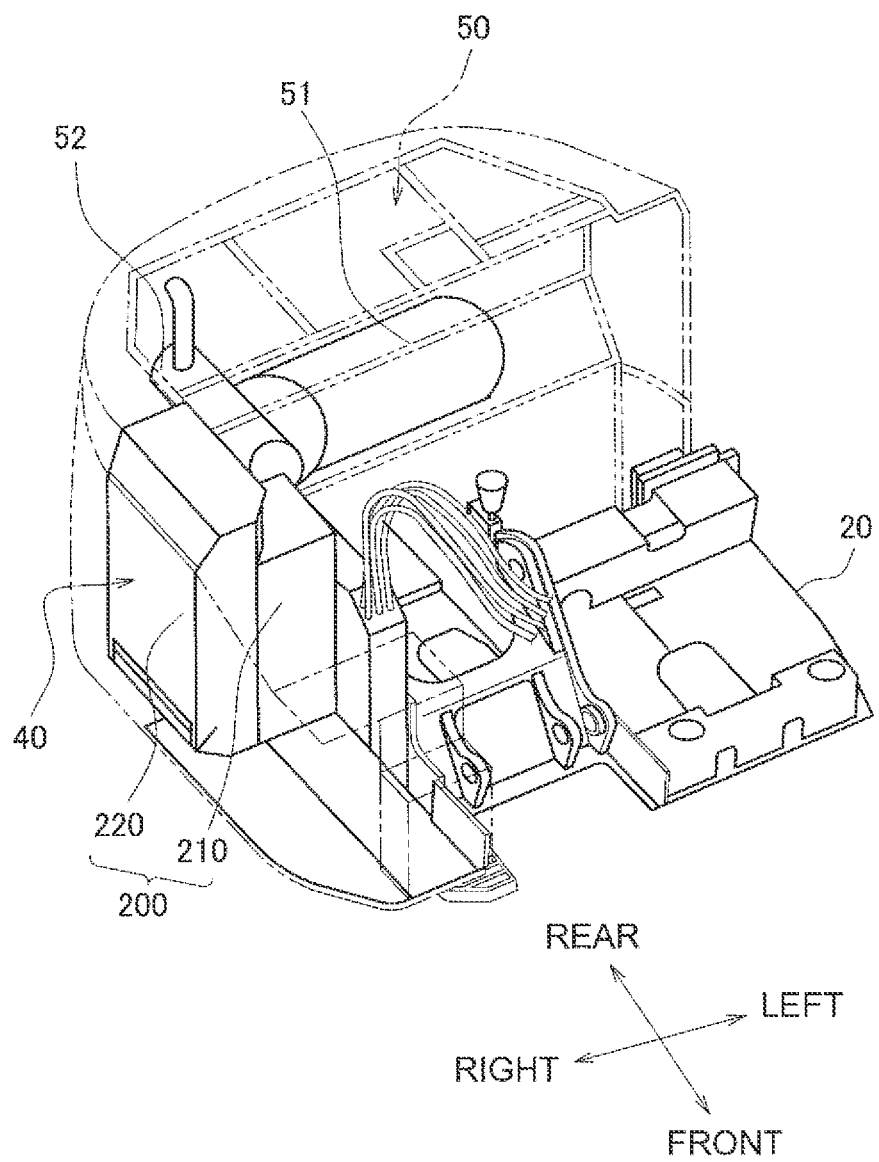
FIG. 9 is a perspective view showing the internal configuration of the hydraulic excavator 100 according to the second embodiment.
Figure 10:
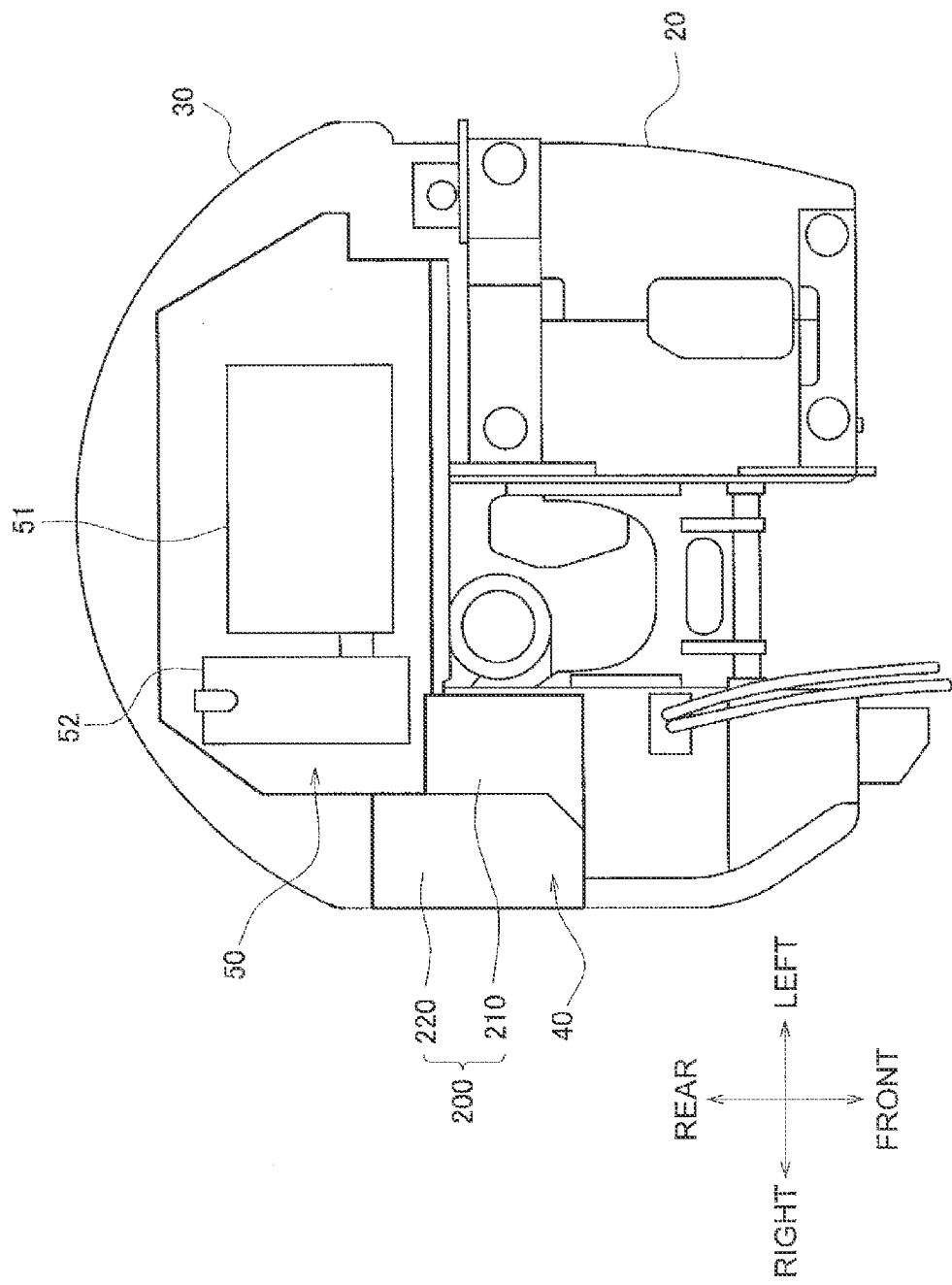
FIG. 10 is a plan view showing the internal configuration of the hydraulic excavator 100 according to the second embodiment.

First, the internal configuration of the construction vehicle 100 according to the second embodiment will be described with reference to the drawings. FIG. 9 is a perspective view showing the internal configuration of the hydraulic excavator 100 according to the second embodiment. FIG. 10 is a plan view showing the internal configuration of the hydraulic excavator 100 according to the second embodiment.

The oil storage tank 200 disposed on the swivel platform 20 is accommodated in the machine compartment 40. The oil storage tank 200 has a hydraulic oil tank 210 and a fuel oil tank 220. The hydraulic oil tank 210 is disposed further inward of the vehicle body than the fuel oil tank 220. The fuel oil tank 220 is disposed on the right end of the vehicle body. The specific configuration of the oil storage tank 200 is described later.

An engine 51 and an exhaust gas treatment device 52 are accommodated in the engine compartment 50. The engine 51 and the exhaust gas treatment device 52 are disposed on the swivel platform 20. The engine 51 generates power using the fuel oil fed from the fuel oil tank 220. The exhaust gas treatment device 52 is connected to the exhaust system of the engine 51 and scavenges particulate matter contained in the exhaust of the engine 51. The exhaust gas treatment device 52 is adjacent to the rear of the oil storage tank 200. The temperature of the exhaust gas treatment device 52 may rise to a high temperature (e.g., about 500° C.) during operations.

Here, in the second embodiment, the hydraulic excavator 100 is a hydraulic excavator with a small rear swivel radius, and the space that can be obtained for the machine compartment 40 and the engine compartment 50 is therefore limited. On the other hand, space in which the exhaust gas treatment device 52 is disposed in the engine compartment 50 must be obtained. Accordingly, the engine compartment 50 is designed so as to encroach into the rear of machine compartment 40, as shown in FIG. 10. Specifically, the rear end of the hydraulic oil tank 210 is positioned further forward than the rear end of the fuel oil tank 220, and the exhaust gas treatment device 52 is rearwardly adjacent to the hydraulic oil tank 210.

Configuration of Oil Storage Tank

Figure 12:
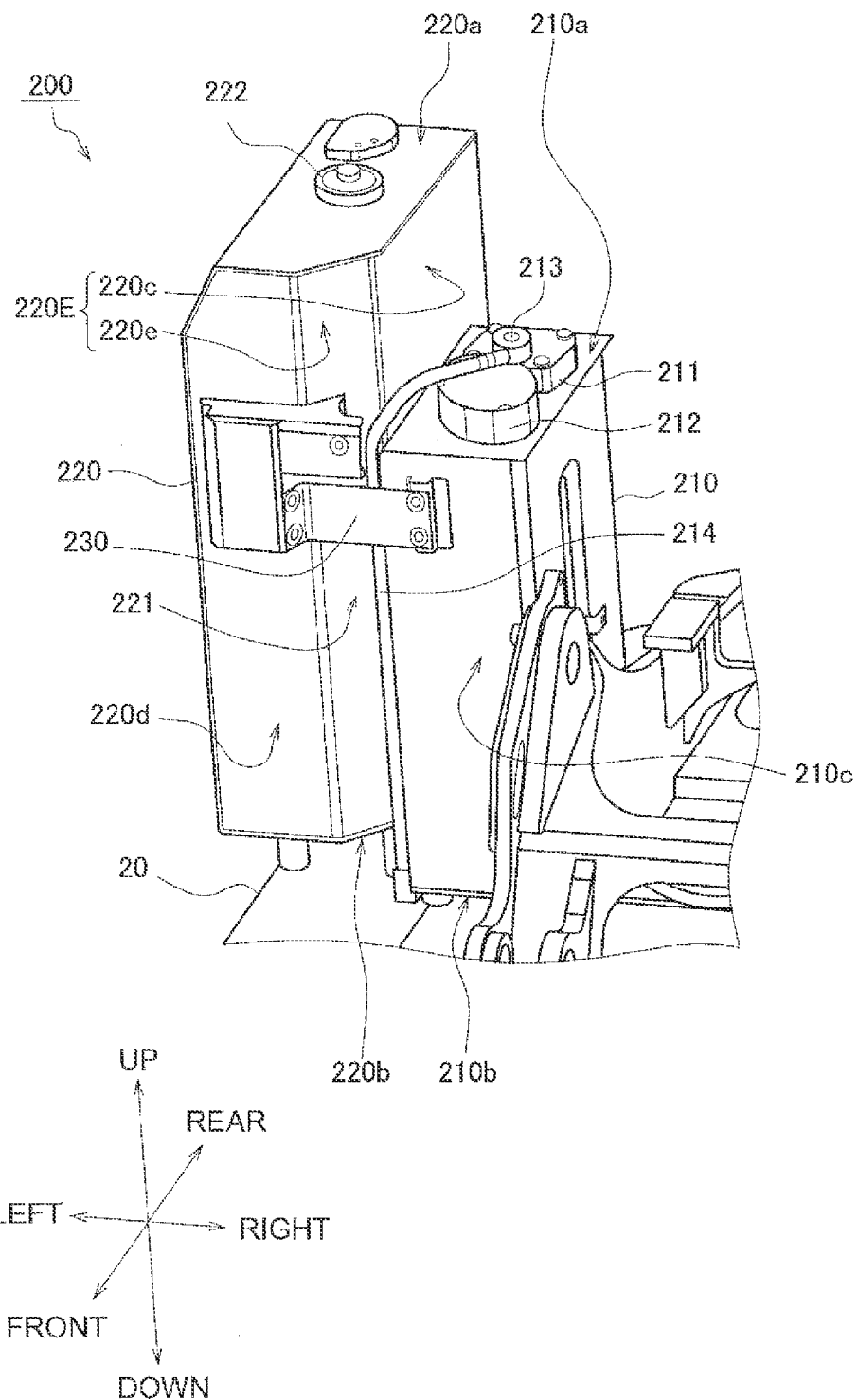
FIG. 12 is a perspective view of the oil storage tank 200 according to the second embodiment as seen from the front upper left.
Figure 13:
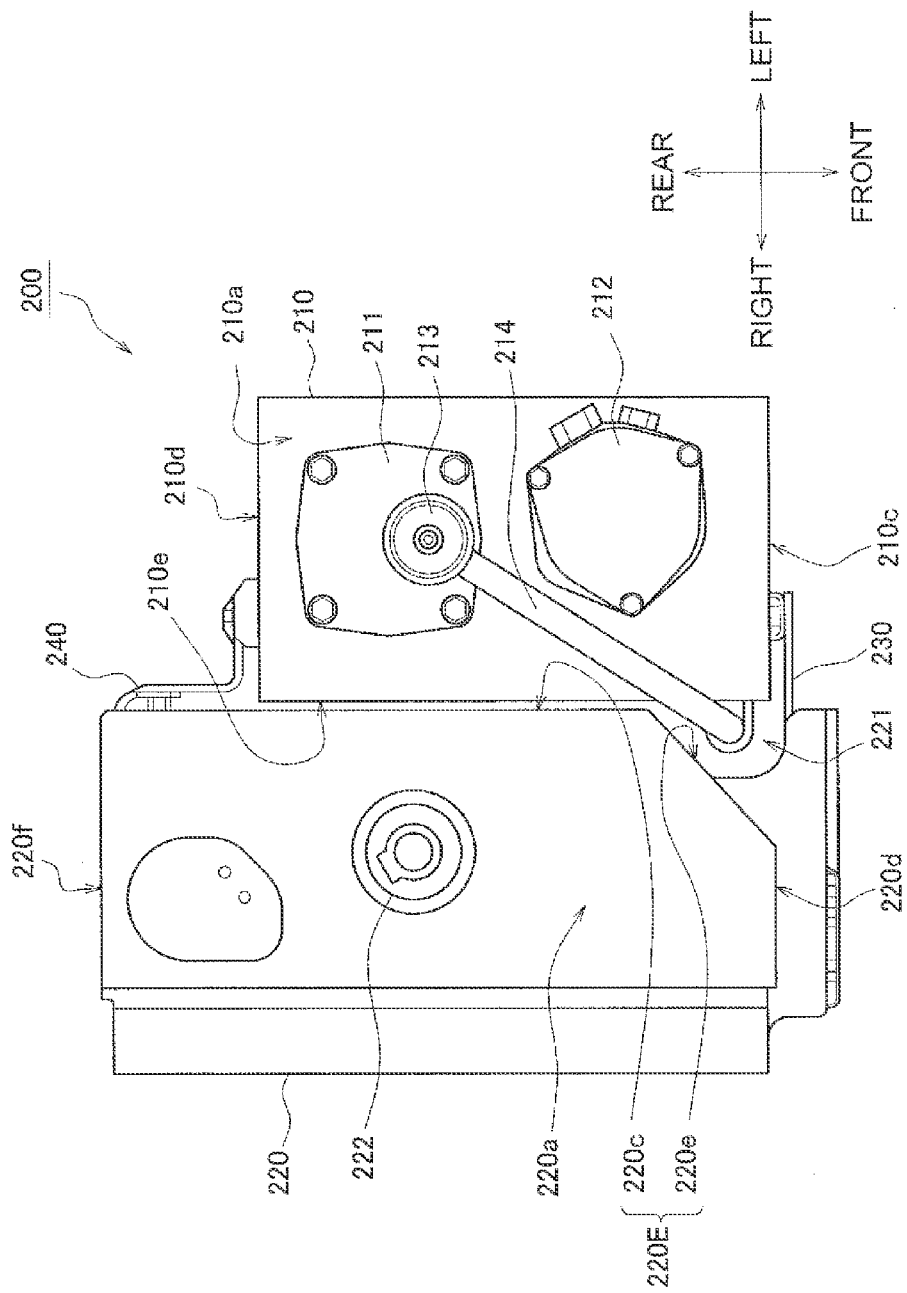
FIG. 13 is a top view of the oil storage tank 200 according to the second embodiment as seen from above.

The configuration of the oil storage tank 200 according to the second embodiment will be described with reference to the drawings. FIG. 11 is a perspective view of the oil storage tank according to the second embodiment as seen from the front upper left. FIG. 12 is a perspective view of the main body of the oil storage tank according to the second embodiment as seen from the front upper left. FIG. 13 is a top view of the oil storage tank according to the second embodiment as seen from above. In FIGS. 12 and 13, the step 260 on the hydraulic oil tank 210 is omitted.

The oil storage tank 200 has a hydraulic oil tank 210, a fuel oil tank 220, a recessed section 221, a first coupling member 230, a second coupling member 240, a plurality of step support members 250, and a step 260.

In the second embodiment, the hydraulic oil tank 210 and the fuel oil tank 220 are coupled together by the first coupling member 230 and the second coupling member 240. However, the hydraulic oil tank 210 and the fuel oil tank 220 are not required to be coupled to each other. The hydraulic oil tank 210 and the fuel oil tank 220 may be arranged adjacent to each other, in direct contact with each other, or set at a distance from each with a predetermined gap. A detailed configuration of the hydraulic oil tank 210 and the fuel oil tank 220 is later described.

The recessed section 221 is formed along the vertical direction in the front face of the oil storage tank 200, as shown in FIGS. 11 and 12. Specifically, the recessed section 221 is sandwiched by the hydraulic-oil-tank facing face 210e of the hydraulic oil tank 210 and the fuel-oil-tank sloped face 220e of the fuel oil tank 220, as shown in FIG. 13.

The first coupling member 230 and the second coupling member 240 couple the hydraulic oil tank 210 and the fuel oil tank 220 together. The first coupling member 230 is disposed in front of the oil storage tank 200. The second coupling member 240 is disposed behind the oil storage tank 200.

The plurality of step support members 250 are disposed on the hydraulic oil tank 210, as shown in FIG. 11. The plurality of step support members 250 support the step 260.

The step 260 is a platform that a worker mounts during work for refueling the oil storage tank 200 and/or performing maintenance inside the engine compartment 50. The step 260 is supported by the plurality of step support members 250. The step 260 has a placement face 260a on which the foot of the worker is placed. The placement face 260a is disposed below the upper face 220a of the fuel oil tank. A vertical difference is thereby provided between the placement face 260a and the upper face 220a.

Detailed Configuration of Hydraulic Oil Tank

A detailed configuration of the hydraulic oil tank 210 is next describe with reference to FIGS. 11 to 13.

The hydraulic oil tank 210 is secured to the top of the swivel platform 20, as shown in FIGS. 11 and 12. The hydraulic oil tank 210 stores hydraulic oil to be fed to the working unit 60.

The hydraulic oil tank 210 has a hydraulic oil tank upper face 210a, a hydraulic oil tank lower face 210b, hydraulic oil tank front face 210c, a hydraulic oil tank rear face 210d, a hydraulic-oil-tank facing face 210e, a maintenance lid 211, a filter device 212, a breather valve 213, and a breather hose 214, as shown in FIGS. 12 and 13.

The hydraulic oil tank upper face 210a is positioned below the placement face 260a of a later-described step 260. The hydraulic oil tank lower face 210b is provided opposite from the hydraulic oil tank upper face 210a, and faces the swivel platform 20. The hydraulic oil tank front face 210c communicates with the hydraulic oil tank upper face 210a and the hydraulic oil tank tower face 210b. The hydraulic oil tank rear face 210d is provided opposite from the hydraulic oil tank front face 210c, and faces the exhaust gas treatment device 52. The hydraulic-oil-tank facing face 210e faces the fuel oil tank 220.

The maintenance lid 211 is detachably attached to the hydraulic oil tank upper face 210a. The maintenance lid 211 is detached, whereby a strainer disposed inside the hydraulic oil tank 210 can be replaced.

The filter device 212 is detachably attached to the hydraulic oil tank upper face 210a. The filter device 212 filters abrasion dust and the like that contaminates the hydraulic oil flowing to the hydraulic oil tank 210.

The breather valve 213 is disposed on the hydraulic oil tank 210 (on the maintenance lid 211 in the second embodiment). The breather valve 213 adjusts the amount of air inside the hydraulic oil tank 210 in accordance with the rise and fall of the fluid face the hydraulic oil. In other words, air flows out from the hydraulic oil tank 210 via the breather valve 213 when the fluid face of the hydraulic oil rises, and air flows into the hydraulic oil tank 210 via the breather valve 213 when the fluid face of the hydraulic oil falls.

Figure 14:
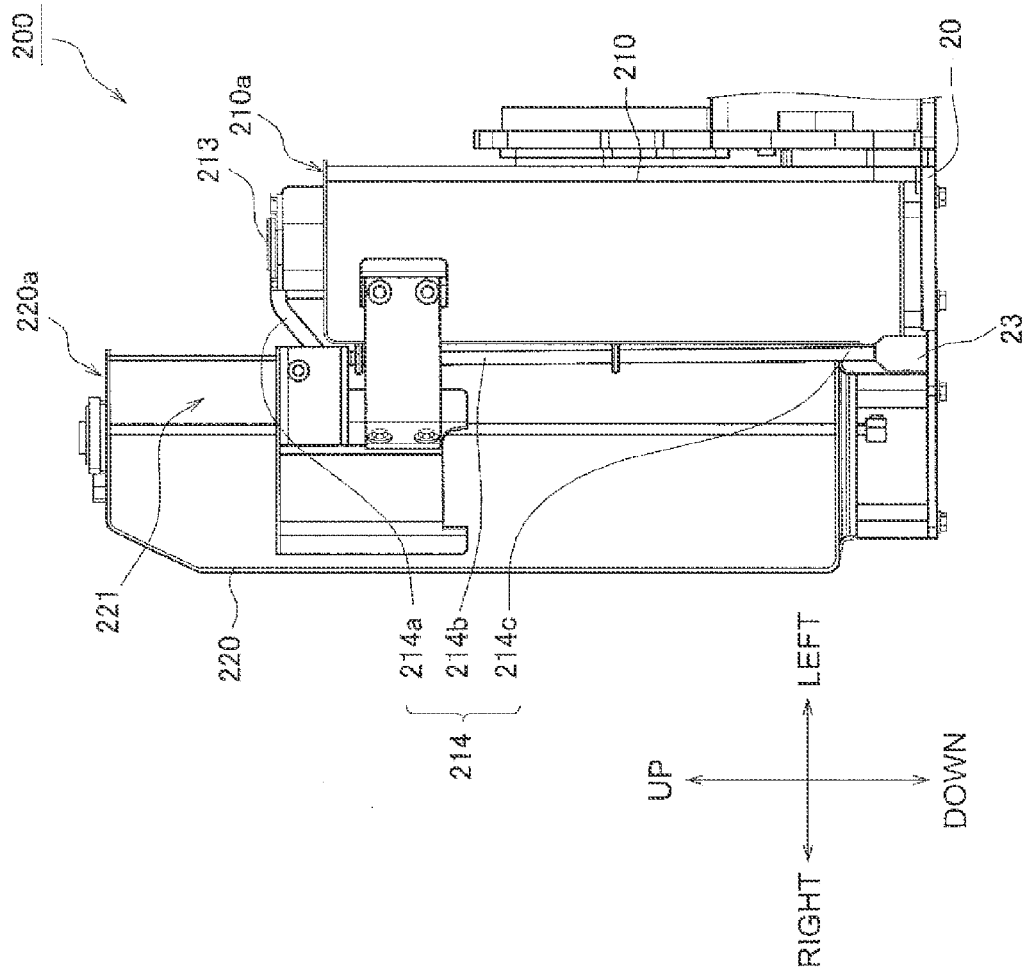
FIG. 14 is a front view showing the configuration of the breather hose according to the second embodiment.

The breather hose 214 is a tube through which air flows into or out from the breather valve 213. FIG. 14 is a front view showing the configuration of the breather hose. The breather hose 214 is composed of a first end 214a, an accommodated portion 214b, and a second end portion 214c, as shown in FIG. 14. The first end 214a is connected to the breather valve 213 and is disposed above an upper face 210a of the hydraulic oil tank. The accommodated portion 214b extends to the first end 214a and is accommodated inside a later-described recessed section 221. The second end portion 214c extends to the accommodated portion 214b and is disposed near the lower end of the hydraulic oil tank 210. The accommodated portion 214b is secured to a hose-securing portion 23 of the swivel platform 20.

Detailed Configuration of Fuel Oil Tank

The fuel oil tank 220 is secured to the top of the swivel platform 20, as shown in FIGS. 11 and 12. The fuel oil tank 220 stores fuel oil to be fed to the engine 51.

The fuel oil tank 220 has a fuel oil tank front face 220d, a fuel oil tank upper face 220a, a fuel oil tank lower face 220b, a fuel oil tank rear face 220f, a fuel-oil-tank facing face 220E, and a fueling port 222, as shown in FIGS. 12 and 13.

The fuel oil tank upper face 220a is positioned above the placement face 260a of the later-described step 260. The fuel oil tank lower face 220b is provided opposite from the fuel oil tank upper face 220a and faces the swivel platform 20. The fuel oil tank lower face 220b is provided lower than the hydraulic oil tank lower face 210b in the vertical direction. The fuel oil tank front face 220d communicates with the fuel oil tank upper face 220a and the fuel oil tank lower face 220b. The fuel oil tank front face 220d is provided in the same position as the hydraulic oil tank front face 210c in the longitudinal direction. The fuel oil tank rear face 220f is provided opposite from the fuel oil tank front face 220d. The fuel oil tank rear face 220f is provided further rearward from the hydraulic oil tank rear face 210d in the longitudinal direction. The fuel-oil-tank sloped face 220E faces the hydraulic oil tank 210.

Here, the fuel-oil-tank facing face 220E has a fuel-oil-tank adjacent face 220c and a fuel-oil-tan sloped face 220e, as shown in FIGS. 12 and 13. The fuel-oil-tank adjacent face 220c is formed along the hydraulic oil tank 210, and is adjacent to and directly facing the hydraulic-oil-tank facing face 210e. The fuel-oil-tank sloped face 220e communicates to the front end of the fuel-oil-tank adjacent face 220c. The fuel-oil-tank sloped face 220e slopes relative to the fuel-oil-tank adjacent face 220c so as to be away from the hydraulic oil tank 210. In the second embodiment, the fuel-oil-tank sloped face 220e slopes relative to the hydraulic-oil-tank adjacent face 210e. The fuel-oil-tank sloped face 220e communicates with the fuel oil tank upper face 220a and the fuel oil tank lower face 220h.

Such a fuel-oil-tank sloped face 220e forms the recessed section 221 together with the above-described hydraulic-oil-tank facing face 210e. The breather hose 214 is disposed along the fuel-oil-tank sloped face 220e.

The fueling port 222 is provided to the top of the fuel oil tank upper filer 220a. Fuel oil is replenished from the fueling port 222.

Operation and Effect (1) In the oil storage tank 200 according to the second embodiment, the fuel oil tank 220 has a fuel-oil-tank facing face 220E that faces the hydraulic oil tank 210. The fuel-oil-tank facing face 220E includes a fuel-oil-tank, sloped face 220e that slopes relative to the fuel-oil-tank adjacent face 220c so as to be away from the hydraulic oil tank 210. The breather hose 214 is disposed along the fuel-oil-tank sloped face 220e.

In this manner, in accordance with the oil storage tank 200 of the second embodiment, the breather hose 214 can be accommodated in along the fuel-oil-tank sloped face 220e. Accordingly, there is no need to obtain space for drawing the breather hose around the outer periphery of the oil storage tank. As a result, the space in which the oil storage tank 200 is disposed can be reduced.

(2) The fuel-oil-tank sloped face 220e according to the second embodiment communicates with the fuel oil tank upper face 220a and the fuel oil tank lower face 220b.

Therefore, the external shape of the oil storage tank 200 can be made simpler than a case in which the fuel-oil-tank, sloped face 220e is discontinuous in the vertical direction. Accordingly, the cost of manufacturing the oil storage tank 200 can be reduced.

(3) The breather hose 214 according to the second embodiment has a second end portion 214c. The second end portion 214c is disposed lower than the fuel oil tank 220.

Therefore, it is possible is minimize soiling of the oil storage tank 200 by the hydraulic oil contained in the air that flows from the second end portion 214c.

(4) In the hydraulic excavator 100 (an example of a "construction vehicle") according to the second embodiment, the fuel-oil-tank sloped face 220e does not face the exhaust gas treatment device 52.

Therefore, it is possible to minimize damage (including melting) to the accommodated portion 214b of the breather hose 214 by heat released from the exhaust gas treatment device 52. As a result, it is possible to eliminate the need to separately provide a heat shield material for guarding the accommodated portion 214b.

(5) In the hydraulic excavator 100 according to the second embodiment, the rear end of the hydraulic oil tank 210 is position further forward than the rear end of the fuel oil tank 220.

Therefore, space for disposing the exhaust gas treatment device 52 is more readily obtained rearward of the hydraulic oil tank 210. This is an effective arrangement in the case that obtaining space for disposing the exhaust gas treatment device 52 is difficult such as with a hydraulic excavator with a small rear swivel radius.

(6) The hydraulic excavator 100 according to the second embodiment comprises a step 260 disposed above the hydraulic oil tank 210.

Therefore, the worker uses the step 260 as a platform, whereby the work of fueling the oil storage tank 200 and/or the movement on the oil storage tank 200 are facilitated.

(7) The upper face of the step 260 according to the second embodiment s lower than the fuel oil tank upper face 220a.

In this manner, a vertical difference is provided between the fuel oil tank upper face 220a and the upper face of the step 260, whereby the vertical difference serves as a fence and it is possible to minimize missteps off the step 260 by the worker.

(8) in the hydraulic excavator 100 according to the second embodiment, the hydraulic oil tank 210 is disposed further inward of the vehicle body than the fuel oil tank 220.

Therefore, it is possible to minimize the possibility that the worker moving on the step 260 will errantly take a misstep off the step 260.

Modification of the Second Embodiment

The present invention is described by the second embodiment above, but the statements and drawings constituting a portion of this disclosure should not be construed as a limitation of the invention. Various alternate embodiments, examples, and operational techniques are apparent from this disclosure to a person skilled in the art.

Figure 15:
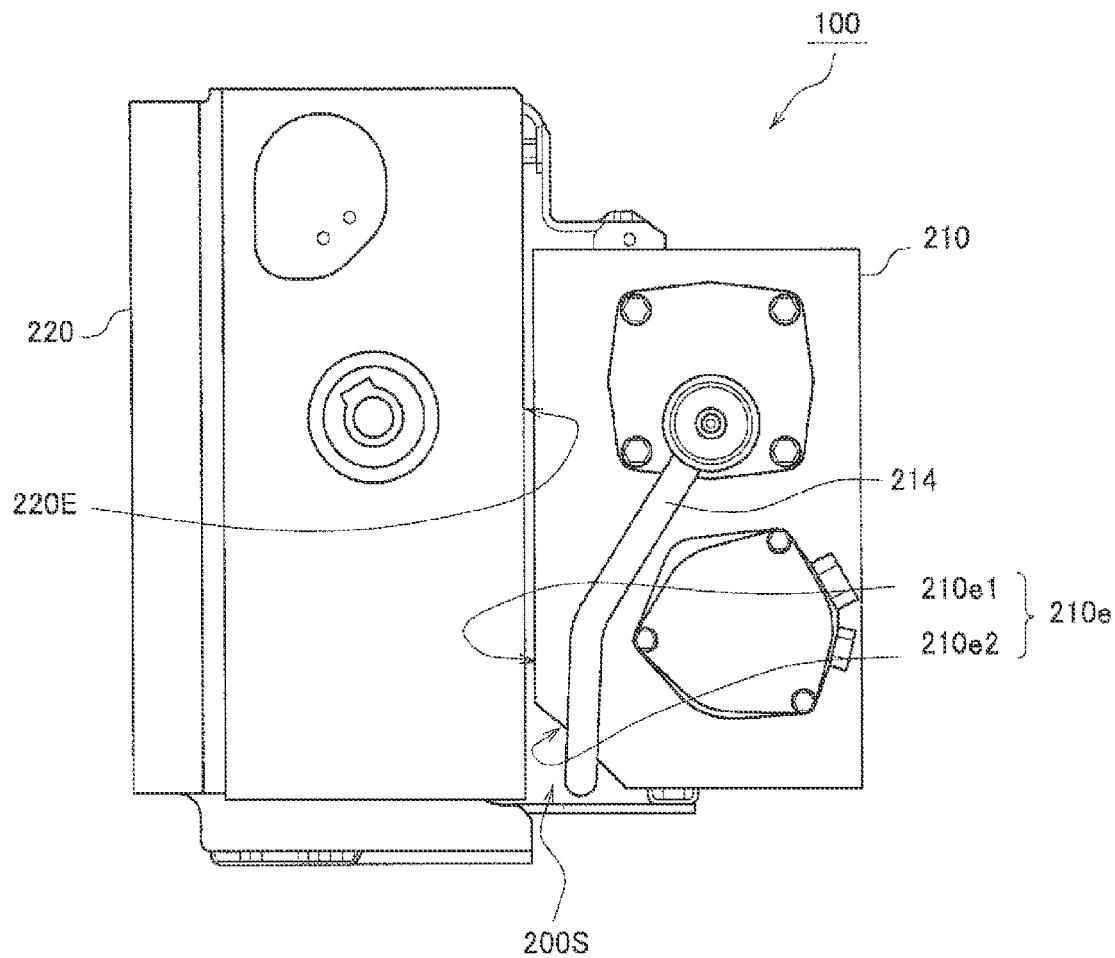
FIG. 15 is a top view showing the configuration of the recessed section 221 according to the second embodiment.
Figure 16:
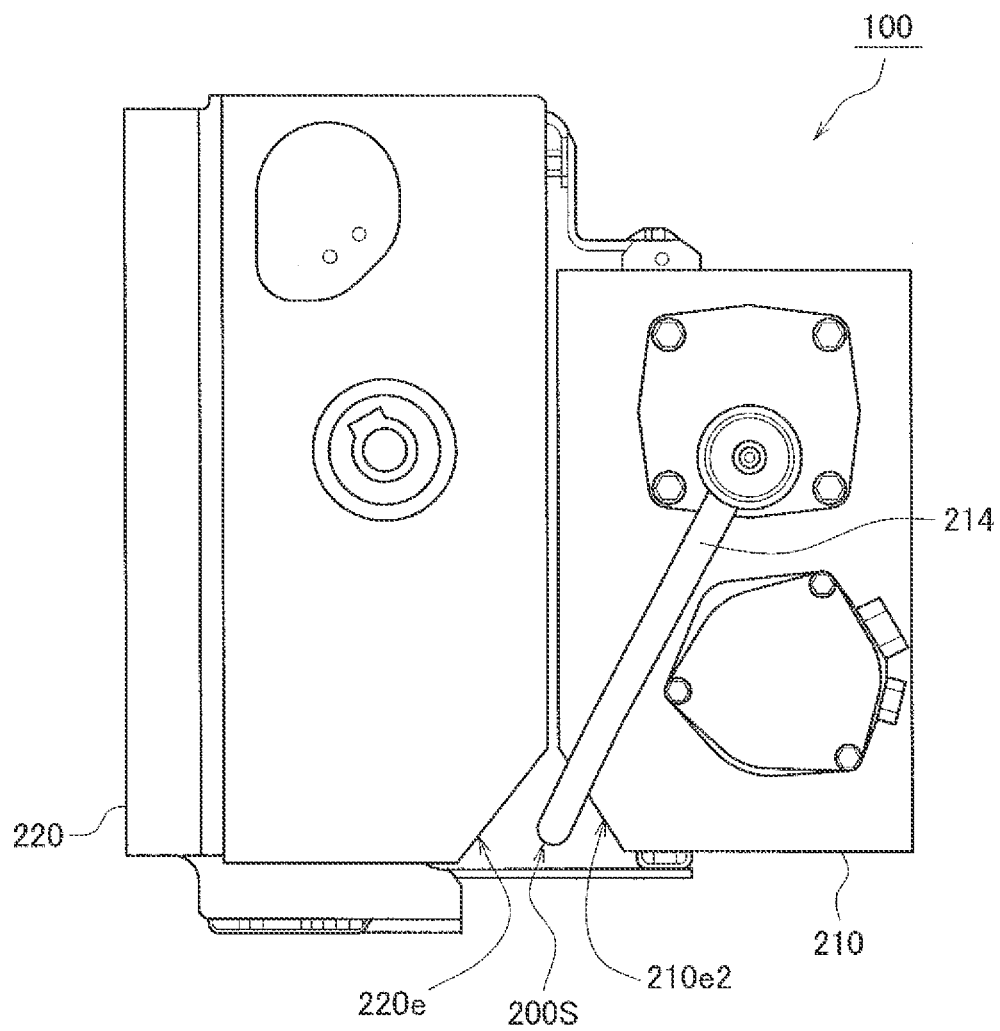
FIG. 16 is a top view showing the configuration of the recessed section 221 according to the second embodiment.

(A) In the second embodiment, the fuel-oil-tank facing face 220E has a fuel-oil-tank sloped face 220e, but no limitation is imposed thereby. The "sloped face" may be formed by the hydraulic-oil-tank facing face 210e or the fuel-oil-tank facing face 220E. For example, the hydraulic-oil-tank facing face 210e may have a hydraulic-oil-tank sloped face 210e2, as shown in FIG. 15. The fuel-oil-tank facing face 220E may have a fuel-oil-tank sloped face 220e, and the hydraulic-oil-tank facing face 210e may have a hydraulic-oil-tank sloped face 210e2, as shown in FIG. 16.

Figure 17:
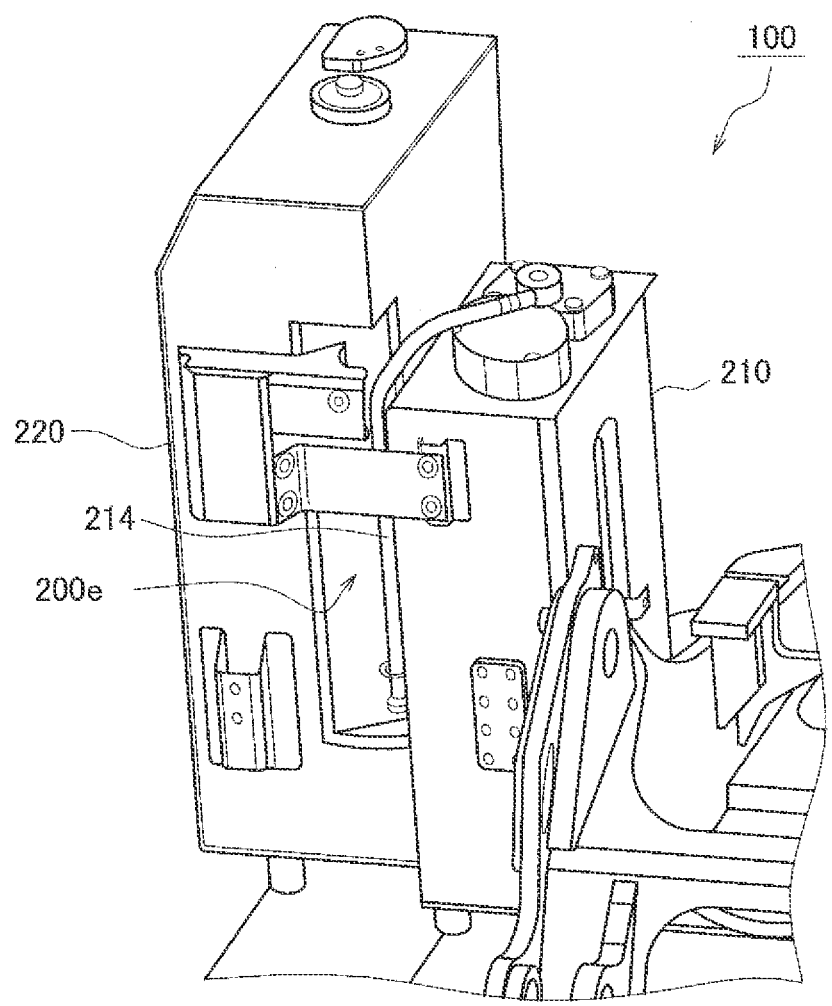
FIG. 17 is a perspective view showing the configuration of the recessed section 221 according to the second embodiment.

(B) In the second embodiment, the fuel-oil-tank sloped face 220e communicates with the fuel oil tank upper face 220a and the fuel oil tank lower face 220b, but no limitation is imposed thereby. For example, the fuel-oil-tank sloped face 220e may communicate with the fuel oil tank upper face 220a and the fuel oil tank lower face 220b, as shown in FIG. 17. However, the upper end of the fuel-oil-tank sloped face 220e is preferably positioned higher than the hydraulic oil tank upper face 210a so that the breather hose 214 can be accommodated in the recessed section 221.

Figure 18:
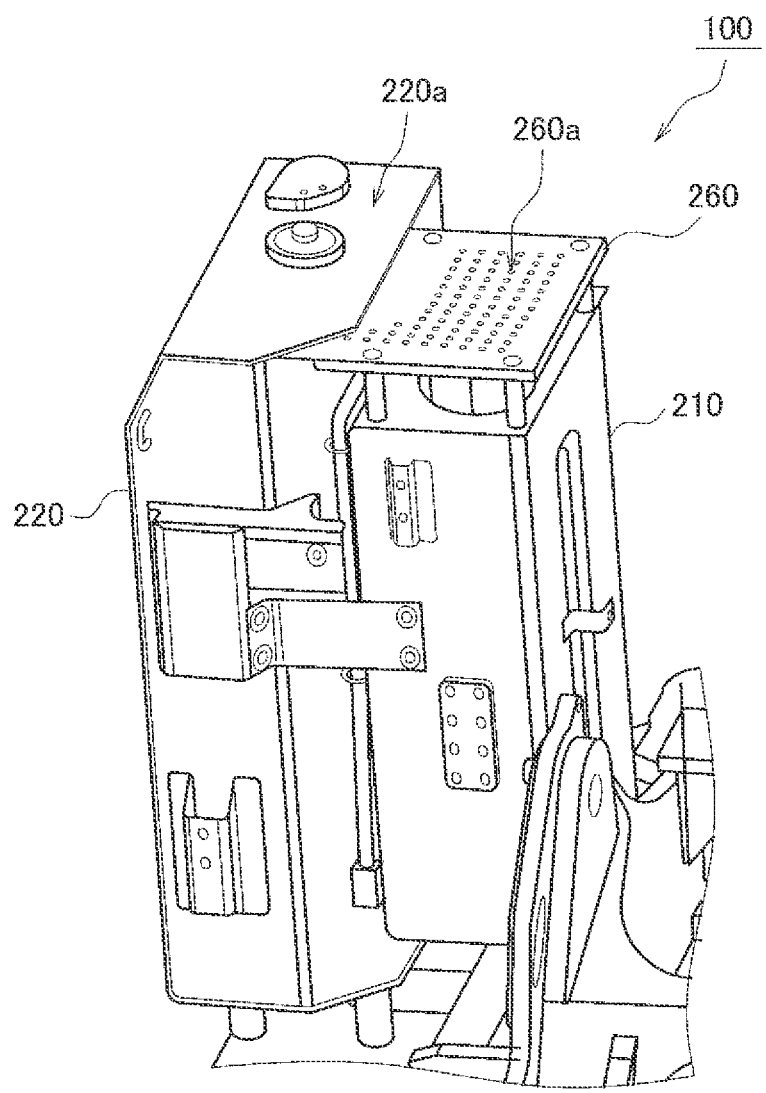
FIG. 18 is a perspective view showing the configuration of the oil storage tank 200 according to the second embodiment.

(C) the second embodiment, a vertical difference is formed between the placement face 260a and the fuel oil tank upper face 220a, but no limitation is imposed thereby. The placement face 260a and the fuel oil tank upper face 220a may be formed flush with each other, as shown in FIG. 18.

Figure 19:
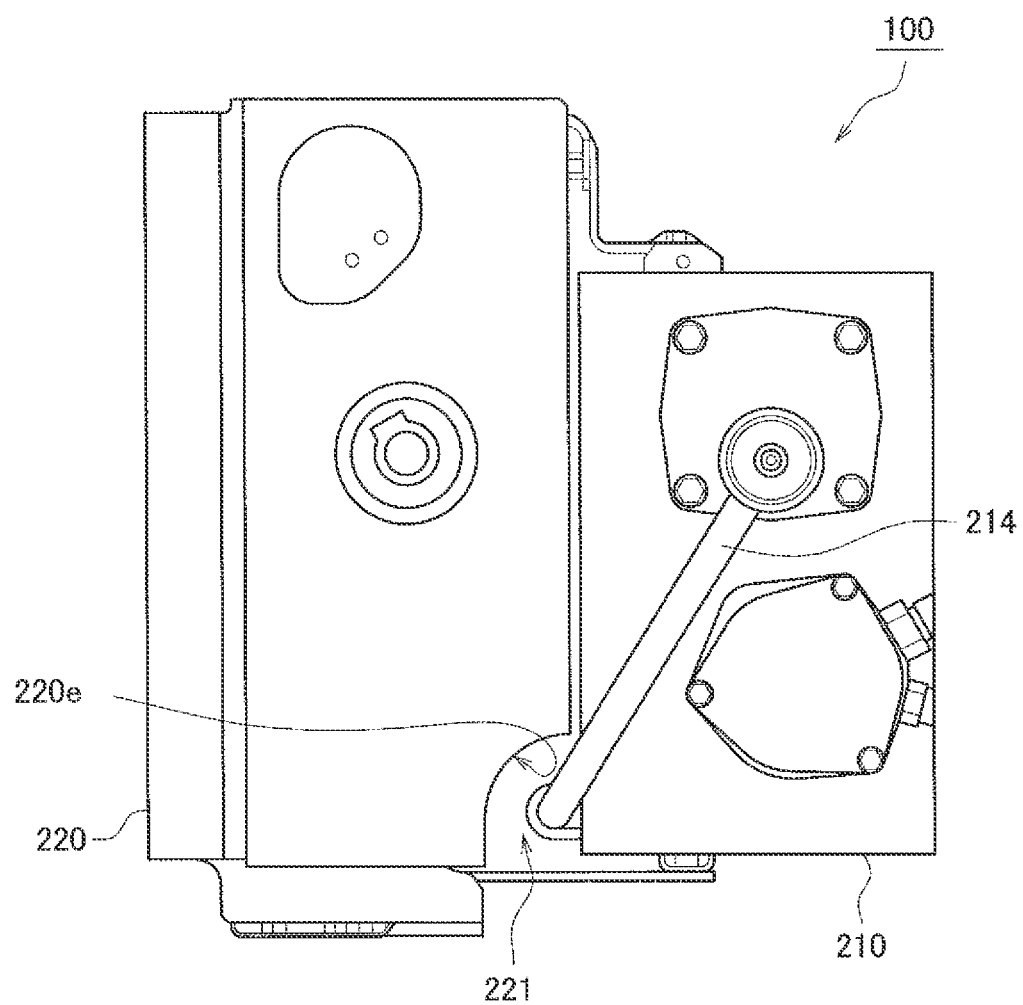
FIG. 19 is a top view showing the configuration of the recessed section 221 according to the second embodiment.

(D) In the second embodiment, the fuel-oil-tank sloped face 220e is formed by a planar face, but no limitation is imposed thereby The fuel-oil-tank sloped face 220e may be formed by a curved face, as shown in FIG. 19.

(E) In the second embodiment, the hydraulic excavator 100 is a hydraulic excavator with a small rear swivel radius, but no limitation is imposed thereby.

(F) In the second embodiment, the hydraulic excavator 100 comprises an exhaust gas treatment device 52, but may also comprise a muffler in place of the exhaust gas treatment device 52.

It is thus apparent that the present invention includes various embodiments and the like that are not described herein. Therefore, the technical range of the present invention is established only by the specific matters of the invention according to the claims reasonable from the description above.

The invention claimed is:

1. An oil storage tank comprising:
a step member having a placement face;
a first tank part disposed below the step member, the first tank part supporting the step member; and
a second tank part coupled to the first tank part, the second tank part having an upper face, a lower face, a first side face, a second side face and a recessed section, the upper face being provided above the placement face, the lower face being provided opposite of the upper face, the first side face facing the first tank part and being connected to the upper face and the lower face, the second side face being connected to the upper face, the lower face and the first side face, and the recessed section being formed by providing a sloped face connected to the upper face, the first side face and the second side face.

2. The oil storage tank according to claim 1, wherein
the first tank part is a hydraulic oil tank configured to store hydraulic oil, and
the second tank part is a fuel oil tank configured to store fuel oil.

3. The oil storage tank according to claim 1, wherein
a lower end of the recessed section is positioned below the placement face in a vertical direction.

4. The oil storage tank according to claim 1, wherein
the sloped face is a planar face.

5. The oil storage tank according to claim 3, wherein
the first tank section has a second-tank facing face that faces the second tank, and
a space is defined between the sloped surface and the second-tank facing face, the space opening in a direction in which the second side face of the second tank faces.

6. The oil storage tank according to claim 1, wherein
the recessed section is disposed between the first tank part and the second tank part and extends in a vertical direction.

7. An oil storage tank comprising:
a step member having a placement face;
a first tank part disposed below the step member, the first tank part supporting the step member; and
a second tank part coupled to the first tank part, the second tank part having an upper face, a lower face, a first side face, a second side face and a recessed section, the upper face being provided above the placement face, the lower face being provided opposite of the upper face, the first side face facing the first tank part and being connected to the upper face and the lower face, the second side face being connected to the upper face, the lower face and the first side face, and the recessed section being formed by providing a sloped face connected to the upper face, the first side face and the second side face,
the step member has an elongated portion elongated into the recessed section.

8. An oil storage tank comprising:
a step member having a placement face;
a first tank part disposed below the step member, the first tank part supporting the step member;
a second tank part coupled to the first tank part, the second tank part having an upper face, a lower face, a first side face, a second side face and a recessed section, the upper face being provided above the placement face, the lower face being provided opposite of the upper face, the first side face facing the first tank part and being connected to the upper face and the lower face, the second side face being connected to the upper face, the lower face and the first side face, and the recessed section being formed by providing a sloped face connected to the upper face, the first side face and the second side face;
a breather valve disposed on the first tank part; and
a breather hose having an end portion and an accommodated portion, the end portion being connected to the breather valve and disposed above the first tank part, and the accommodated portion communicating with the end portion and being accommodated in the recessed section,
the first tank part being a hydraulic oil tank configured to store hydraulic oil, and the second tank part being a fuel oil tank configured to store fuel oil.

9. A construction vehicle comprising:
a working unit;
an engine; and
an oil storage tank disposed in front of the engine, the oil storage tank including
a step member having a placement face for placing a foot,
a first tank part disposed below the step member, the first tank part supporting the step member, and
a second tank part coupled to the first tank part, the second tank part having an upper face, a lower face, a first side face, a second side face and a recessed section, the upper face being provided above the placement face, the lower face being provided opposite of the upper face, the first side face facing the first tank part and being connected to the upper face and the lower face, the second side face being connected to the upper face, the lower face and the first side face, and the recessed section being formed by providing a sloped face connected to the upper face, the first side face and the second side face.

10. The construction vehicle according to claim 9, wherein
the first tank part is a hydraulic oil tank configured to store hydraulic oil to be fed to the working unit, and
the second tank part is a fuel oil tank configured to store fuel oil to be fed to the engine.

11. The construction vehicle according to claim 9, wherein
a lower end of the recessed section is positioned below the placement face in the vertical direction.

12. The oil storage tank according to claim 11, wherein
the first tank section has a second-tank facing face that faces the second tank, and
a space is defined between the sloped surface and the second-tank facing face, the space opening in a direction in which the second side face of the second tank faces.

13. The construction vehicle according to claim 9, wherein
the sloped face is a planar face.

14. The oil storage tank according to claim 9, wherein
the recessed section is disposed between the first tank part and the second tank part and extends in a vertical direction.

15. The oil storage tank according to claim 9, wherein
the first tank part and the second tank part are arranged adjacently along a widthwise direction of the construction vehicle.

16. The oil storage tank according to claim 15, wherein
the second tank part is arranged on a widthwise outward side of the first tank part such that the first tank part is located closer to the working machine along the widthwise direction than the second tank part.

17. A construction vehicle comprising:
a working unit;
an engine; and
an oil storage tank disposed in front of the engine, the oil storage tank including
  a step member having a placement face for placing a foot,
  a first tank part disposed below the step member, the first tank part supporting the step member, and
a second tank part coupled to the first tank part, the second tank part having an upper face, a lower face, a first side face, a second side face and a recessed section, the upper face being provided above the placement face, the lower face being provided opposite of the upper face, the first side face facing the first tank part and being connected to the upper face and the lower face, the second side face being connected to the upper face, the lower face and the first side face, and the recessed section being formed by providing a sloped face connected to the upper face, the first side face and the second side face,
the step member having an elongated portion elongated into the recessed section.

18. A construction vehicle comprising:
a working unit;
an engine; and
an oil storage tank disposed in front of the engine, the oil storage tank including
  a step member having a placement face for placing a foot,
  a first tank part disposed below the step member, the first tank part supporting the step member, and
a second tank part coupled to the first tank part, the second tank part having an upper face, a lower face, a first side face, a second side face and a recessed section, the upper face being provided above the placement face, the lower face being provided opposite of the upper face, the first side face facing the first tank part and being connected to the upper face and the lower face, the second side face being connected to the upper face, the lower face and the first side face, and the recessed section being formed by providing a sloped face connected to the upper face, the first side face and the second side face,
the working unit has a hydraulic hose disposed in front of the step member, and
the sloped face faces the hydraulic hose.

19. A construction vehicle comprising:
a working unit;
an engine; and
an oil storage tank disposed in front of the engine, the oil storage tank including
  a step member having a placement face for placing a foot,
  a first tank part disposed below the step member, the first tank part supporting the step member;
a second tank part coupled to the first tank part, the second tank part having an upper face, a lower face, a first side face, a second side face and a recessed section, the upper face being provided above the placement face, the lower face being provided opposite of the upper face, the first side face facing the first tank part and being connected to the upper face and the lower face, the second side face being connected to the upper face, the lower face and the first side face, and the recessed section being formed by providing a sloped face connected to the upper face, the first side face and the second side face;
a breather valve disposed on the first tank part; and
a breather hose having an end portion and an accommodated portion, the end portion being connected to the breather value and disposed above the first tank part, and the accommodated portion communicating with the end portion and being accommodated in the recessed section,
the first tank part being a hydraulic oil tank configured to store hydraulic oil to be fed to the working unit, and
the second tank part being a fuel oil tank configured to store fuel oil to be fed to the engine.

* * * * *